United States Patent
Li et al.

(10) Patent No.: US 12,470,930 B2
(45) Date of Patent: Nov. 11, 2025

(54) SERVICE AUTHORIZATION METHOD, APPARATUS, AND SYSTEM

(71) Applicant: HUAWEI TECHNOLOGIES CO., LTD., Guangdong (CN)

(72) Inventors: Fei Li, Shenzhen (CN); Chengdong He, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 521 days.

(21) Appl. No.: 17/950,187

(22) Filed: Sep. 22, 2022

(65) Prior Publication Data

US 2023/0019000 A1 Jan. 19, 2023

Related U.S. Application Data

(63) Continuation of application No. PCT/CN2020/121594, filed on Oct. 16, 2020.

(30) Foreign Application Priority Data

Mar. 23, 2020 (CN) .......................... 202010209382.4

(51) Int. Cl.
*H04W 12/084* (2021.01)
*H04W 12/08* (2021.01)
*H04W 48/18* (2009.01)

(52) U.S. Cl.
CPC ......... *H04W 12/084* (2021.01); *H04W 12/08* (2013.01); *H04W 48/18* (2013.01)

(58) Field of Classification Search
CPC .... H04W 12/084; H04W 12/08; H04W 48/18
See application file for complete search history.

(56) References Cited

U.S. PATENT DOCUMENTS

2011/0055374 A1 3/2011 Christenson et al.
2019/0253894 A1* 8/2019 Bykampadi ............. H04L 67/51
(Continued)

FOREIGN PATENT DOCUMENTS

CN 107666723 A 2/2018
CN 109688586 A 4/2019
(Continued)

OTHER PUBLICATIONS

Interdigital Inc.,"Solution for supporting Non-standalone NPN", SA WG2 Meeting #129 S2-1810275, Oct. 15-Oct. 19, 2018, Dongguan, China, Total 4 Pages.
(Continued)

*Primary Examiner* — Wayne H Cai

(57) ABSTRACT

Embodiments of this application relate to a service authorization method and system, and an apparatus. The method includes: a first network repository function (NRF) receives a first request requesting an access token for accessing a service of a second network function (NF) in a second network from a first NF, where the first NF and the first NRF are located in a first network, and the first request includes standalone non-public network (SNPN) information of the first network and/or the second network; the first NRF forwards the first request to a second NRF located in the second network; the second NRF generates an access token in response to the first request, where the access token includes the SNPN information of the first network and/or the second network; the second NRF sends the access token to the first NRF, and the first NRF receives the access token and sends the access token to the first NF.

13 Claims, 16 Drawing Sheets

(56) References Cited

U.S. PATENT DOCUMENTS

2021/0321303 A1* 10/2021 Nair .................... H04L 63/0281
2022/0240172 A1*  7/2022 Hallenstål ............. H04W 88/18
2022/0346051 A1* 10/2022 Salkintzis ........... H04W 12/037

FOREIGN PATENT DOCUMENTS

| CN | 110035433 A | 7/2019 |
| CN | 110213808 A | 9/2019 |
| CN | 110536331 A | 12/2019 |
| CN | 110636587 A | 12/2019 |
| CN | 110753346 A | 2/2020 |
| WO | 2020036364 A1 | 2/2020 |

OTHER PUBLICATIONS

3GPP TS 33.501 V16.1.0 (Dec. 2019) 3rd Generation Partnership Project;Technical Specification Group Services and System Aspects; Security architecture and procedures for 5G system (Release 16), Total 202 Pages.

International Search Report and Written Opinion issued in PCT/CN2020/121594, dated Jan. 6, 2021, 9 pages.

Office Action issued in CN202010209382.4, dated Jan. 12, 2022, 10 pages.

* cited by examiner

SERVICE AUTHORIZATION METHOD, APPARATUS, AND SYSTEM

CROSS-REFERENCE TO RELATED APPLICATIONS

This application is a continuation of International Application No. PCT/CN2020/121594, filed on Oct. 16, 2020. The International Application claims priority to Chinese Application No. 202010209382.4, filed on Mar. 23, 2020. The disclosures of the aforementioned applications are hereby incorporated by reference in their entireties.

TECHNICAL FIELD

This application relates to the field of communication technologies, and in particular, to a service authorization method, an apparatus, and a system.

BACKGROUND

The 3rd Generation Partnership Project (3GPP) defines a service-based architecture (SBA) network. A network function (NF) service consumer in the network may send a service request to an NF service producer. To support this feature, the 3GPP introduces a network repository function (NRF) network element to provide functions such as network function registration, maintenance, discovery, and access authorization.

In a roaming scenario, that is, when the NF service consumer is located in a visited network and the NF service producer is located in a home network, each network element identifies the visited network and the home network by including public land mobile network (PLMN) identifiers (IDs) of the NF service consumer and the NF service producer in an interaction message (such as an access token request message or a service request message).

The foregoing solution applies only to the PLMN roaming scenario. Actually, in addition to the PLMN network, there is also a standalone non-public network (SNPN). When a type of the home network and/or a type of the visited network are/is the SNPN, if the home network or the visited network is still identified by including a PLMN ID in an interaction process according to an existing method, service authorization or a service request may not be successfully completed.

SUMMARY

Embodiments of this application provide a service authorization method and system, and an apparatus, to resolve a problem that in an SNPN network roaming scenario, service authorization or a service request cannot be successfully completed because a home network and/or a visited network cannot be uniquely identified, and improve network reliability and security.

According to a first aspect, a service authorization method is provided, including: A first network repository function (NRF) receives a first request from a first network function (NF), where the first NF and the first NRF are located in a first network, the first request is used to request an access token, the access token is used to access a service of a second NF in a second network, and the first request includes standalone non-public network (SNPN) information of the first network and/or SNPN information of the second network. The first NRF forwards the first request to a second NRF, where the second NRF is located in the second network. The second NRF generates an access token in response to the first request, where the access token includes the SNPN information of the first network and/or the SNPN information of the second network. The second NRF sends the access token to the first NRF. The first NRF receives the access token from the second NRF. The first NRF sends the access token to the first NF.

According to the technical solution provided in this embodiment, when the first network is an SNPN network, the first NF adds the SNPN information of the first network to the first request, or when the second network is an SNPN network, the first NF adds the SNPN information of the second network to the first request. In this way, both a network that requests an access token and a network that is requested for an access token in a service authorization process can be uniquely identified, and this ensures that a process in which the first NF requests the access token can be successfully completed, and improves service authorization reliability. In addition, the returned access token also carries corresponding SNPN information, to specify a service consumer and a service producer authorized by the access token, and this further improves service authorization reliability.

With reference to the first aspect, in a first possible design of the first aspect, the SNPN information of the first network includes a network identifier (NID) and a public land mobile network identifier (PLMN ID), and/or the SNPN information of the second network includes an NID and a PLMN ID.

In this implementation, an SNPN network may be uniquely identified in a form of a combination of an NID and a PLMN ID, and this improves reliability of network interaction.

With reference to the first aspect or the first possible design of the first aspect, in a second possible design of the first aspect, the method further includes: The first NF sends a first service request message to a first security edge protection proxy (SEPP), where the first SEPP is located in the first network, and the first service request message carries the access token. The first SEPP generates a second service request message based on the first service request message. The first SEPP sends the second service request message to a second SEPP, where the second SEPP is located in the second network, and the second service request message carries an N32 interface context identifier and the access token. The second SEPP determines an N32 interface context corresponding to the N32 interface context identifier. The second SEPP checks whether remote SNPN information recorded in the N32 interface context matches the SNPN information of the first network, and if the remote SNPN information does not match the SNPN information of the first network, the second SEPP returns an error code to the first SEPP.

In this implementation, when the first network is SNPN information, the second SEPP in the second network presets SNPN information of the first SEPP in the N32 interface context; or when the second network is SNPN information, the first SEPP in the first network presets SNPN information of the second SEPP in the N32 interface context. In this way, security check can be performed on signaling between the first network and the second network by using the N32 interface context, and this can further improve network security.

With reference to the first aspect or the first possible design of the first aspect, in a third possible design of the first aspect, the method further includes: The first NF sends a service request message to the second NF, where the service request message is used to request the service of the second NF, and the service request message carries the access token and standalone non-public network (SNPN) information of the first network. The second NF checks the access token, and if check on the access token succeeds, the second NF returns a service response message to the first NF.

According to the technical solution provided in this embodiment of this application, when the first network is an SNPN network, an authorization token carries the SNPN information of the first network, or when the second network is an SNPN network, an authorization token carries the SNPN information of the second network. In this way, a network of a service requester and a network of a requested party can be uniquely identified in a service request process, and this ensures that a service request process of the first NF can be successfully completed, improves reliability of a service request, and improves network security by preventing malicious attacks.

With reference to the third possible design of the first aspect, in a fourth possible design of the first aspect, that the second NF checks the access token includes: The second NF checks whether the SNPN information of the second network in the access token matches SNPN information of the second NF and/or the second NF checks whether the SNPN information of the first network in the access token matches the SNPN information of the first network carried in the service request message.

In this implementation, SNPN information in the access token is checked, and this improves reliability of a service request, and improves network security by preventing malicious attacks.

According to a second aspect, a service authorization method is provided, including: A first network repository function (NRF) receives a first request from a first network function (NF), where the first NF and the first NRF are located in a first network, the first request is used to request an access token, the access token is used to access a service of a second NF in a second network, and the first request includes standalone non-public network (SNPN) information of the first network and/or SNPN information of the second network. The first NRF forwards the first request to a second NRF, where the second NRF is located in the second network. The first NRF receives an access token from the second NRF. The first NRF sends the access token to the first NF.

With reference to the second aspect, in a first possible design of the second aspect, the SNPN information of the first network includes a network identifier (NID) and a public land mobile network identifier (PLMN ID), and/or the SNPN information of the second network includes an NID and a PLMN ID.

According to a third aspect, a service authorization method is provided, including:

A second network repository function (NRF) receives a first request from a first NRF, where the first NRF is located in a first network, the second NRF is located in a second network, the first request is used to request an access token, the access token is used to access a service of a second network function (NF) in the second network, and the first request includes standalone non-public network (SNPN) information of the first network and/or SNPN information of the second network.

The second NRF generates an access token in response to the first request, where the access token includes the SNPN information of the first network and/or the SNPN information of the second network.

The second NRF sends the access token to the first NRF.

With reference to the third aspect, in a first possible design of the third aspect, the SNPN information of the first network includes a network identifier (NID) and a public land mobile network identifier (PLMN ID), and/or the SNPN information of the second network includes an NID and a PLMN ID.

According to a fourth aspect, a service authorization method is provided, including: A first network function (NF) generates a first request, where the first NF is located in a first network, the first request is used to request an access token, the access token is used to access a service of a second NF in a second network, and the first request includes standalone non-public network (SNPN) information of the first network and/or SNPN information of the second network. The first NF sends the first request to a first network repository function (NRF), where the first NRF is located in the first network. The first NF receives an access token, where the access token includes the SNPN information of the first network and/or the SNPN information of the second network.

With reference to the fourth aspect, in a first possible design of the fourth aspect, the SNPN information of the first network includes a network identifier (NID) and a public land mobile network identifier (PLMN ID), and/or the SNPN information of the second network includes an NID and a PLMN ID.

With reference to the fourth aspect or the first possible design of the fourth aspect, in a second possible design of the fourth aspect, the method further includes: The first NF sends a first service request message to a first security edge protection proxy (SEPP), where the first SEPP is located in the first network, and the first service request message carries the access token.

With reference to the fourth aspect or the first possible design of the fourth aspect, in a third possible design of the fourth aspect, the method further includes: The first NF sends a service request message to the second NF, where the service request message is used to request the service of the second NF, and the service request message carries the access token and standalone non-public network (SNPN) information of the first network.

According to a fifth aspect, a service request method is provided, including: A second network function (NF) receives a service request message from a first NF, where the first NF is located in a first network, the second NF is located in a second network, the service request message is used to request a service of the second NF, the service request message carries an access token and standalone non-public network (SNPN) information of the first network, and the access token includes the SNPN information of the first network and/or SNPN information of the second network. The second NF checks the access token, and if check on the access token succeeds, the second NF returns a service response message to the first NF.

With reference to the fifth aspect, in a first possible design of the fifth aspect, the SNPN information of the first network includes a network identifier (NID) and a public land mobile network identifier (PLMN ID), and/or the SNPN information of the second network includes an NID and a PLMN ID.

With reference to the fifth aspect or the first possible design of the fifth aspect, in a second possible design of the fifth aspect, that the second NF checks the access token includes: The second NF checks whether the SNPN information of the second network in the access token matches SNPN information of the second NF and/or the second NF checks whether the SNPN information of the first network in the access token matches the SNPN information of the first network carried in the service request message.

According to a sixth aspect, a service request method is provided, including: A first security edge protection proxy (SEPP) receives a first service request message from a first network function (NF), where the first SEPP is located in a first network, the first service request message carries an access token, and the access token includes SNPN information of the first network and/or SNPN information of a second network. The first SEPP generates a second service request message based on the first service request message. The first SEPP sends the second service request message to a second SEPP, where the second SEPP is located in the second network, and the second service request message carries an N32 interface context identifier and the access token.

With reference to the sixth aspect, in a first possible design of the sixth aspect, the SNPN information of the first network includes a network identifier (NID) and a public land mobile network identifier (PLMN ID), and/or the SNPN information of the second network includes an NID and a PLMN ID.

According to a seventh aspect, a service request method is provided, including: A second security edge protection proxy SEPP receives a second service request message from a first SEPP, where the first SEPP is located in a first network, the second SEPP is located in a second network, the second service request message carries an N32 interface context identifier and an access token, and the access token includes SNPN information of the first network and/or SNPN information of the second network. The second SEPP determines an N32 interface context corresponding to the N32 interface context identifier. The second SEPP checks whether remote SNPN information recorded in the N32 interface context matches the SNPN information of the first network, and if the remote SNPN information does not match the SNPN information of the first network, the second SEPP returns an error code to the first SEPP.

With reference to the seventh aspect, in a first possible design of the seventh aspect, the SNPN information of the first network includes a network identifier (NID) and a public land mobile network identifier (PLMN ID), and/or the SNPN information of the second network includes an NID and a PLMN ID.

According to an eighth aspect, a service authorization system is provided, including: a first network function (NF), configured to send a first request: a first network repository function (NRF), configured to: receive the first request from the first NF, where the first NF and the first NRF are located in a first network, the first request is used to request an access token, the access token is used to access a service of a second NF in a second network, and the first request includes standalone non-public network (SNPN) information of the first network and/or SNPN information of the second network, and forward the first request to a second NRF, where the second NRF is located in the second network; and the second NRF, configured to: receive the first request, generate an access token in response to the first request, where the access token includes the SNPN information of the first network and/or the SNPN information of the second network, and send the access token to the first NRF. The first NRF is further configured to: receive the access token from the second NRF, and send the access token to the first NF; and the first NF is further configured to receive the access token.

With reference to the eighth aspect, in a first possible design of the eighth aspect, the SNPN information of the first network includes a network identifier (NID) and a public land mobile network identifier (PLMN ID), and/or the SNPN information of the second network includes an NID and a PLMN ID.

With reference to the eighth aspect or the first possible design of the eighth aspect, in a second possible design of the eighth aspect, the system further includes a first security edge protection proxy (SEPP) and a second SEPP. The first NF is further configured to send a first service request message to the first SEPP, where the first SEPP is located in the first network, and the first service request message carries the access token. The first SEPP is configured to: generate a second service request message based on the first service request message, and send the second service request message to the second SEPP, where the second SEPP is located in the second network, and the second service request message carries an N32 interface context identifier and the access token. The second SEPP "s co'figured to: receive the second service request message, determine an N32 interface context corresponding to the N32 interface context identifier, and check whether remote SNPN information recorded in the N32 interface context matches the SNPN information of the first network; and if the remote SNPN information does not match the SNPN information of the first network, the second SEPP is further configured to return an error code to the first SEPP.

With reference to the eighth aspect or the first possible design of the eighth aspect, in a third possible design of the eighth aspect, the first NF is further configured to send a service request message to the second NF, where the service request message is used to request the service of the second NF, and the service request message carries the access token and standalone non-public network (SNPN) information of the first network; and the second NF is further configured to: check the access token, and if check on the access token succeeds, return a service response message to the first NF.

With reference to the third possible design of the eighth aspect, in a fourth possible design of the eighth aspect, when checking the access token, the second NF is specifically configured to: check whether the SNPN information of the second network in the access token matches SNPN information of the second NF and/or check whether the SNPN information of the first network in the access token matches the SNPN information of the first network carried in the service request message.

According to a ninth aspect, a communication apparatus is provided, including: a receiving unit, configured to receive a first request from a first network function (NF), where the first NF and the apparatus are located in a first network, the first request is used to request an access token, the access token is used to access a service of a second NF in a second network, and the first request includes standalone non-public network (SNPN) information of the first network and/or SNPN information of the second network; and a sending unit, configured to forward the first request to a second NRF, where the second NRF is located in the second network. The receiving unit is further configured to receive an access token from the second NRF; and the sending unit is further configured to send the access token to the first NF.

With reference to the ninth aspect, in a first possible design of the ninth aspect, the SNPN information of the first network includes a network identifier (NID) and a public land mobile network identifier (PLMN ID), and/or the SNPN information of the second network includes an NID and a PLMN ID.

According to a tenth aspect, a communication apparatus is provided, including: a receiving unit, configured to receive a first request from a first NRF, where the first NRF is located in a first network, the apparatus is located in a second network, the first request is used to request an access token, the access token is used to access a service of a second network function (NF) in the second network, and the first request includes standalone non-public network (SNPN) information of the first network and/or SNPN information of the second network: a processing unit, configured to generate an access token in response to the first request, where the access token includes the SNPN information of the first network and/or the SNPN information of the second network; and a sending unit, configured to send the access token to the first NRF.

With reference to the tenth aspect, in a first possible design of the tenth aspect, the SNPN information of the first network includes a network identifier (NID) and a public land mobile network identifier (PLMN ID), and/or the SNPN information of the second network includes an NID and a PLMN ID.

According to an eleventh aspect, a communication apparatus is provided, including: a processing unit, configured to generate a first request, where the apparatus is located in a first network, the first request is used to request an access token, the access token is used to access a service of a second NF in a second network, and the first request includes standalone non-public network (SNPN) information of the first network and/or SNPN information of the second network: a sending unit, configured to send the first request to a first network repository function (NRF), where the first NRF is located in the first network; and a receiving unit, configured to receive an access token, where the access token includes the SNPN information of the first network and/or the SNPN information of the second network.

With reference to the eleventh aspect, in a first possible design of the eleventh aspect, the SNPN information of the first network includes a network identifier (NID) and a public land mobile network identifier (PLMN ID), and/or the SNPN information of the second network includes an NID and a PLMN ID.

With reference to the eleventh aspect or the first possible design of the eleventh aspect, in a second possible design of the eleventh aspect, the sending unit is further configured to send a first service request message to a first security edge protection proxy (SEPP), where the first SEPP is located in the first network, and the first service request message carries the access token.

With reference to the eleventh aspect or the first possible design of the eleventh aspect, in a third possible design of the eleventh aspect, the sending unit is further configured to send a service request message to the second NF, where the service request message is used to request the service of the second NF, and the service request message carries the access token and the SNPN information of the first network.

According to a twelfth aspect, a communication apparatus is provided, including: a receiving unit, configured to receive a service request message from a first NF, where the first NF is located in a first network, the apparatus is located in a second network, the service request message is used to request a service of the apparatus, the service request message carries an access token and standalone non-public network (SNPN) information of the first network, and the access token includes the SNPN information of the first network and/or SNPN information of the second network; a processing unit, configured to check the access token, and a sending unit, configured to return a service response message to the first NF when check on the access token succeeds.

With reference to the twelfth aspect, in a first possible design of the twelfth aspect, the SNPN information of the first network includes a network identifier (NID) and a public land mobile network identifier (PLMN ID), and/or the SNPN information of the second network includes an NID and a PLMN ID.

With reference to the twelfth aspect or the first possible design of the twelfth aspect, in a second possible design of the twelfth aspect, the processing unit is specifically configured to: check whether the SNPN information of the second network in the access token matches SNPN information of the apparatus and/or check whether the SNPN information of the first network in the access token matches the SNPN information of the first network carried in the service request message.

According to a thirteenth aspect, a communication apparatus is provided, including: a receiving unit, configured to receive a first service request message from a first network function (NF), where the apparatus is located in a first network, the first service request message carries an access token, and the access token includes SNPN information of the first network and/or SNPN information of a second network: a processing unit, configured to generate a second service request message based on the first service request message; and a sending unit, configured to send the second service request message to a second SEPP, where the second SEPP is located in the second network, and the second service request message carries an N32 interface context identifier and the access token.

With reference to the thirteenth aspect, in a first possible design of the thirteenth aspect, the SNPN information of the first network includes a network identifier (NID) and a public land mobile network identifier (PLMN ID), and/or the SNPN information of the second network includes an NID and a PLMN ID.

According to a fourteenth aspect, a communication apparatus is provided, including: a receiving unit, configured to receive a second service request message from a first SEPP, where the first SEPP is located in a first network, the apparatus is located in a second network, the second service request message carries an N32 interface context identifier and an access token, and the access token includes SNPN information of the first network and/or SNPN information of the second network: a processing unit, configured to determine an N32 interface context corresponding to the N32 interface context identifier and check whether remote SNPN information recorded in the N32 interface context matches the SNPN information of the first network; and a sending unit, configured to return an error code to the first SEPP when the remote SNPN information does not match the SNPN information of the first network.

With reference to the fourteenth aspect, in a first possible design of the fourteenth aspect, the SNPN information of the first network includes a network identifier (NID) and a public land mobile network identifier (PLMN ID), and/or the SNPN information of the second network includes an NID and a PLMN ID.

According to a fifteenth aspect, a communication apparatus is provided, including at least one processor, and a memory and a communication interface that are communicatively connected to the at least one processor, where the memory stores instructions that can be executed by the at least one processor, and the at least one processor executes the instructions stored in the memory, to perform the methods according to any one of the second aspect to the seventh aspect or any possible design of any one of the second aspect to the seventh aspect.

According to a sixteenth aspect, a computer-readable storage medium is provided, including a program or instructions. When the program or the instructions are run on a computer, the methods according to any one of the second aspect to the seventh aspect or any possible design of any one of the second aspect to the seventh aspect are performed.

According to a seventeenth aspect, a chip is provided, where the chip is coupled to a memory, and is configured to read and execute program instructions stored in the memory, to implement the methods according to any one of the second aspect to the seventh aspect or any possible design of any one of the second aspect to the seventh aspect.

According to an eighteenth aspect, a computer program product is provided, including instructions. When the computer program product runs on a computer, the computer is enabled to perform the methods according to any one of the second aspect to the seventh aspect or any possible design of any one of the second aspect to the seventh aspect.

DESCRIPTION OF EMBODIMENTS

To make the objectives, technical solutions and advantages of embodiments of this application clearer, the following further describes embodiments of this application in detail with reference to the accompanying drawings.

Currently, an access authorization mechanism defined according to the 3GPP 33.501 among an NF service consumer, an NRF, and an NF service producer is based on OAuth2.0. The NRF corresponds to an authorization server in Oauth2.0. The NF service consumer corresponds to a client in Oauth2.0. The NF service producer corresponds to a resource server in Oauth2.0. For ease of description, in some of the following descriptions, an "authorization server" is used to describe an "NRF" (that is, the "authorization server" and the "NRF" may be replaced with each other, and are not distinguished in this specification), a "client" is used to describe an "NF service consumer" (that is, the "NF service consumer" and the "client" may be replaced with each other, and are not distinguished in this specification), and a "service end" or a "server" is used to describe an "NF service producer" (that is, the "service end" or the "server" and the "NF service producer" may be replaced with each other, and are not distinguished in this specification).

A main procedure in which the NF service consumer requests a service from the NF service producer includes the following two steps.

1. The NF service consumer registers with an NRF and obtains an access token.

2. The NF service consumer requests the service from the NF service provider.

Figure 1:
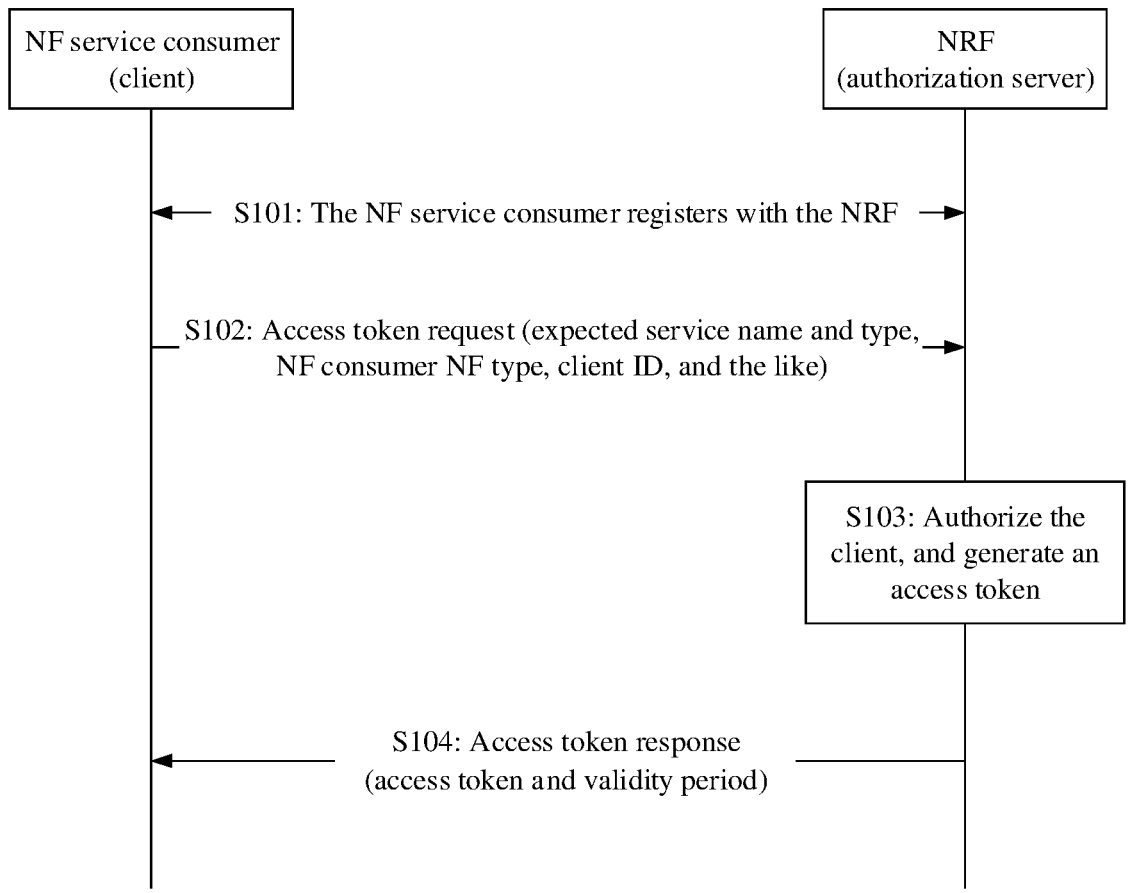
FIG. 1 is a schematic diagram of a service authorization process in a non-roaming scenario in a conventional technology.

For a procedure of the step 1, refer to FIG. 1.

S101: The NF service consumer first registers with the NRF.

S102: The NF service consumer sends an access token request to the NRF, where the access token request carries an expected service name and type, a client identifier (client ID), a client function type (NF consumer NF type), and the like of the NF service consumer.

S103: After receiving the access token request, the NRF generates a corresponding access token after authenticating the NF service consumer, where a claim part in the access token carries an NF instance ID of the NRF (issuer), an NF instance ID of the NF service consumer (subject), an NF type of a producer (audience), an expected service name (scope), expiration time (expiration), and the like.

S104: The NRF sends a response message including the access token to the NF service consumer.

Figure 2:
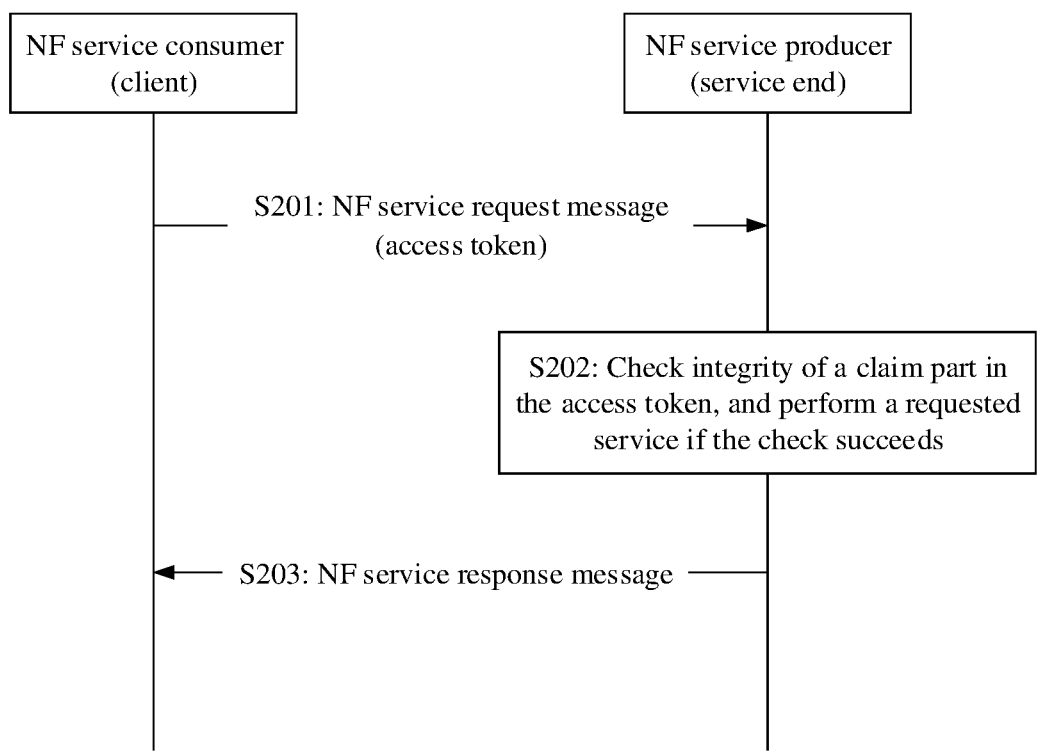
FIG. 2 is a schematic diagram of a service request process in a non-roaming scenario in a conventional technology.

For a procedure of the step 2, refer to FIG. 2.

S201: The NF service consumer sends a service request message to the NF service producer, where the service request message carries an access token obtained from the NRF.

S202: The NF service producer checks integrity of a claim part in the access token, and accepts the service request of the NF service consumer if the check succeeds.

S203: The NF service producer returns a service response message to the NF service consumer.

The procedures shown in FIG. 1 and FIG. 2 are service authorization and service request processes in a non-roaming scenario (that is, a client and a service end are located in a same public land mobile network (PLMN)). However, in a roaming scenario (that is, a client and a service end are located in different PLMNs, the client is located in a visited network, and the service end is located in a home network), corresponding service authorization and service request processes are respectively shown in FIG. 3 and FIG. 4.

Figure 3:
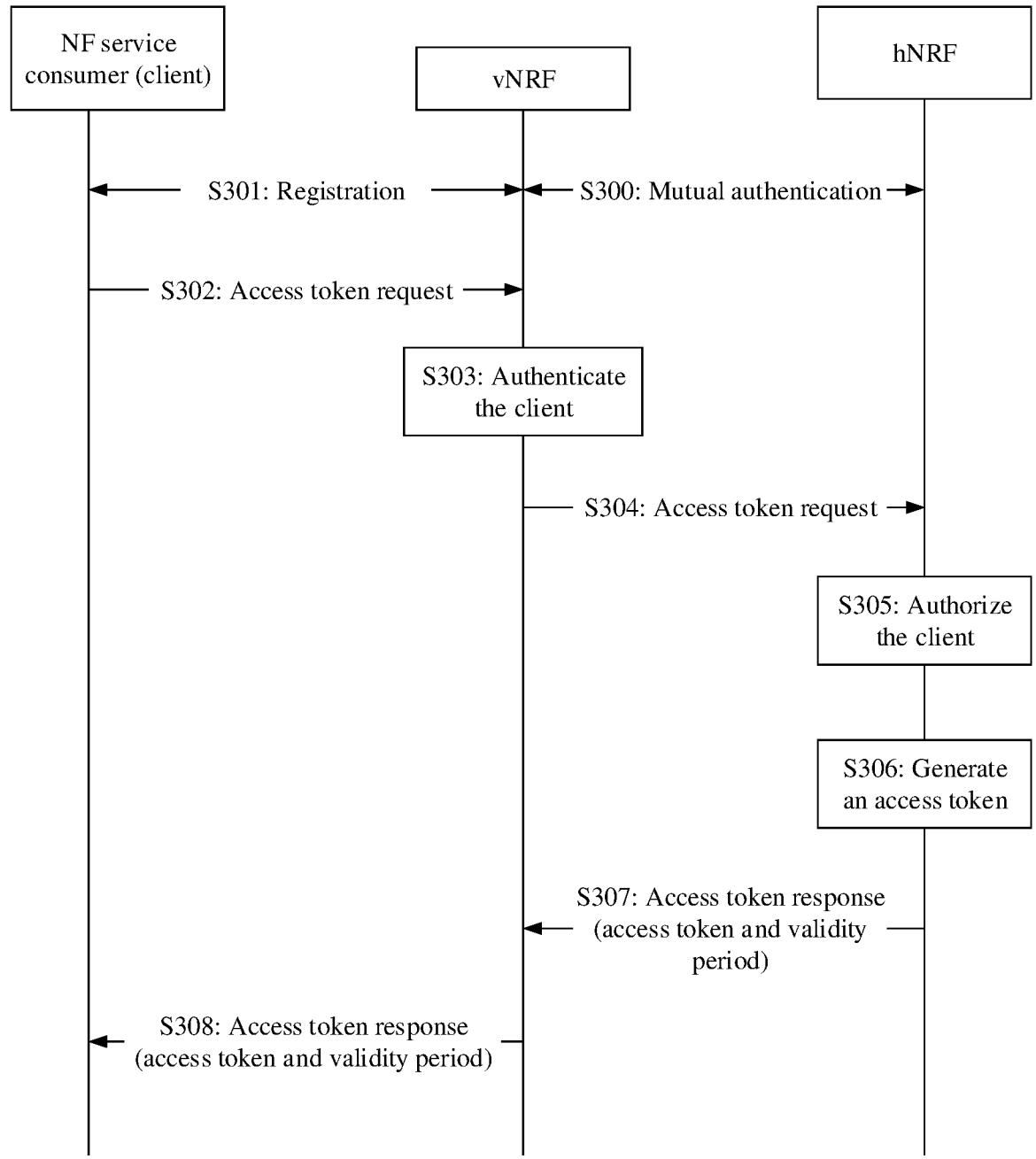
FIG. 3 is a schematic diagram of a service authorization process in a roaming scenario in a conventional technology.

With reference to FIG. 3, the service authorization process in the roaming scenario includes the following steps.

S301: A client registers with a visited network repository function (visited NRF, vNRF).

S302: The client sends an access token request message to the vNRF.

S303: The vNRF performs authentication on the client, and performs S304 after the authentication succeeds.

S304: The vNRF sends the access token request message to a home network repository function (home NRF, hNRF).

S305: The hNRF authorizes the client.

S306: The hNRF generates an access token, and the access token has a validity period.

S307: The hNRF returns an access token response message to the vNRF, and the access token response message carries the access token and the validity period.

S308: The vNRF returns the access token response message to the client, and the access token response message carries the access token and the validity period.

Before step S304 is performed, S300 further needs to be performed. S300: The hNRF and the vNRF perform mutual authentication. The vNRF can forward the access token request message of the client to the hNRF only after the mutual authentication between the hNRF and the vNRF succeeds.

Figure 4:
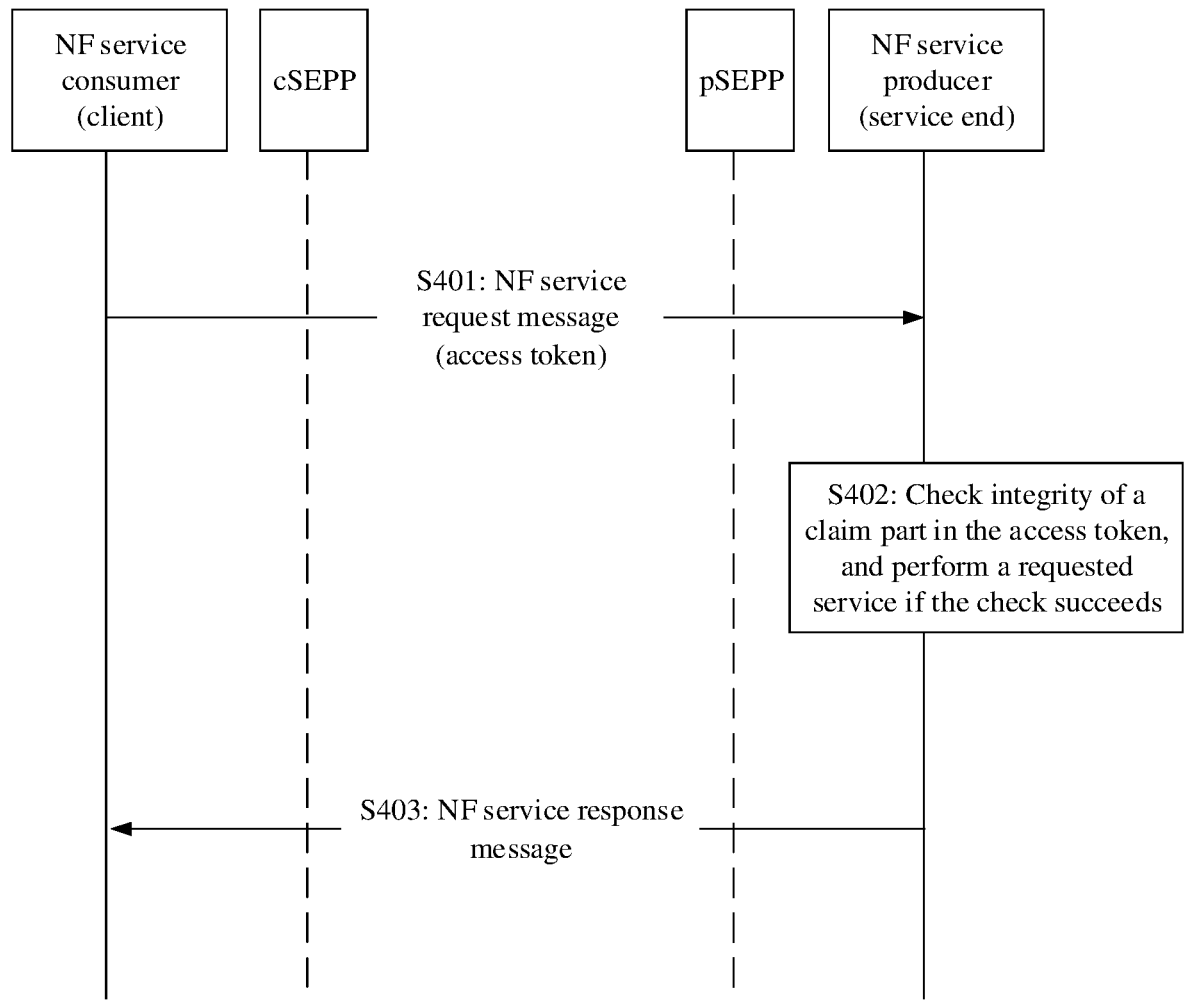
FIG. 4 is a schematic diagram of a service request process in a roaming scenario in a conventional technology.

With reference to FIG. 4, a difference between a service request process in a roaming scenario and a service request process in a non-roaming scenario lies in that a client and a service end need to exchange a message via a security edge protection proxy (SEPP), and the SEPP is responsible for signaling security protection between a visited network and a home network in the roaming scenario. A SEPP in the visited network is a service consumer SEPP (service consumer, cSEPP), and a SEPP in the home network is referred to as a service producer SEPP (producer SEPP, pSEPP). The CSEPP in the visited network is configured to: perform security processing on a message sent by the client to the service end and send the message to the pSEPP in the home network. The pSEPP in the home network is configured to: perform security processing on a message sent by the service end to the client and send the message to the cSEPP. The cSEPP is further configured to: receive a message sent by the pSEPP, perform security processing on the message, and send the message to the client. The pSEPP is further configured to receive a message sent by the cSEPP, perform security processing on the message, and send the message to the service end.

In the roaming scenario described in FIG. 3 and FIG. 4, both the home network and the visited network are PLMNs. Therefore, during a PLMN network roaming authorization and service request, the home network and the visited network are identified by using PLMN IDs. Therefore, both the access token request and a claim of the access token include a PLMN ID of the client. In addition, the service end checks the corresponding PLMN ID.

For example, the client includes PLMN IDs of the visited network and the home network in the access token request. In addition, when generating a token, the NRF in the home network writes the PLMN IDs of the visited network and the home network into the claim of the access token. In the subsequent service request, the service end checks whether a PLMN ID in the service request is consistent with the PLMN ID of the client in the access token, and checks whether a home PLMN ID of the service end is consistent with a PLMN ID of the service end in the access token.

In a conventional technology, only a PLMN network roaming scenario is considered for an access token request and a service request in a roaming scenario. However, actually, in addition to the foregoing PLMN, there is also a standalone non-public network (SNPN) in the conventional technology.

The SNPN shares a same network element with the PLMN in terms of a network architecture, but differs from the PLMN in terms of a service object, a networking scale, and user subscription. For example, a private network established in an enterprise campus is an SNPN. In a scenario in which the client accesses an SNPN network by using a third-party credential, the SNPN is considered as a visited network, and an SNPN or a PLMN in which the third-party credential is located is considered as a home network.

When home networks or visited networks are SNPNs, if the home networks or the visited networks are still identified by using a PLMN ID carried in an access token request process and a service request process according to the existing method, the following scenario may exist. If two visited SNPNs (for example, an SNPN A and an SNPN B) having a same PLMN ID have a roaming access relationship with a third-party network (an SNPN C or a PLMN C), the third-party network cannot identify a specific visited network from which a request comes. Alternatively, if a visited network has a roaming access relationship with two third-party networks having a same PLMN ID, a client cannot distinguish a specific third-party network to which a request should be sent. In other words, in access authorization and service request processes, an SNPN network cannot be uniquely identified. Consequently, access authorization or a service request of the client cannot be completed, and network reliability and security are low.

To resolve the foregoing one or more technical problems, a service authorization method and system, and an apparatus in embodiments of this application are provided. The technical solutions in embodiments of this application may be applied to various communication systems, for example, a 4th generation (4G) communication system, a 5th generation (5G) communication system, another future evolved system, or various other wireless communication systems that use a wireless access technology.

Figure 5:
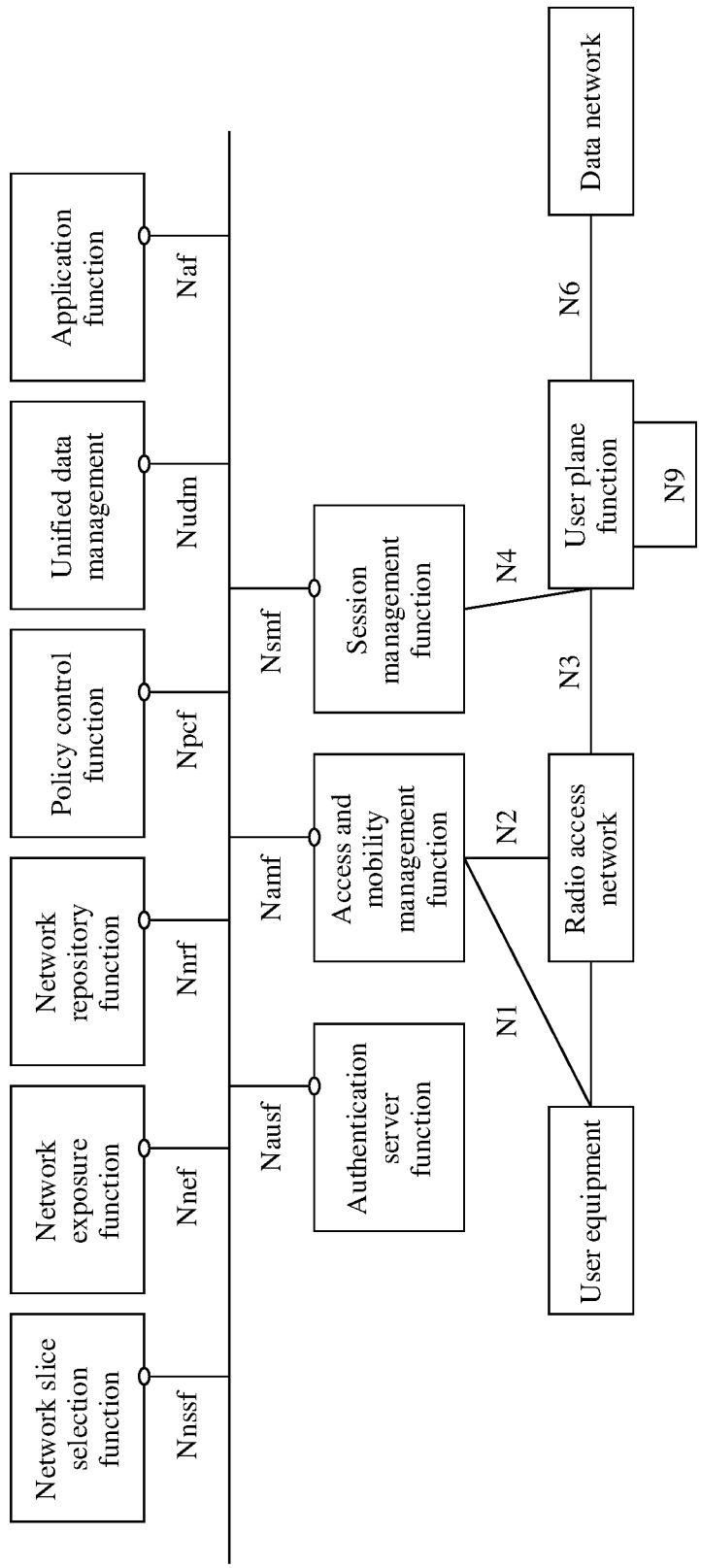
FIG. 5 is a schematic diagram of a structure of a communication system to which an embodiment of this application is applicable.

For example, FIG. 5 shows a communication system to which an embodiment of this application is applicable. The communication system includes user equipment (UE), a radio access network (RAN), and a core network (CN). The user equipment may access the radio access network through an access network device such as a base station, and establish a communication connection to an external data network (DN) through the core network. The core network is mainly used for user equipment registration, security authentication, mobility management, location management, session management, data packet forwarding between the user equipment and the external data network, and the like.

The radio access network may be a next generation access network (NG-AN).

The core network includes the following network functions: a session management function (SMF), an access and mobility management function (AMF), a user plane function (UPF), unified data management (UDM), a policy control function (PCF), an authentication server function (AUSF), a network slice selection function (NSSF), a network exposure function (NEF), a network repository function (NRF), an application function (AF), and the like. The NRF is configured to: maintain a network element instance and a configuration file (profile) of a service of the network element instance, and provide an NF service consumer with a service discovery service (in other words, accept a service discovery request of the NF service consumer, and return corresponding instance information of an NF service producer to the requester) and an authorization service (in other words, issue an access token).

It should be noted that the core network may include one or more core network devices. The core network devices may be a network element configured to perform the foregoing single network function, or may be a network element configured to perform the foregoing plurality of network functions. When one core network device is configured to perform the plurality of network functions, the core network device may include one or more functional modules configured to perform the plurality of network functions. The functional modules may be software modules, or may be software/hardware modules. This is not limited in embodiments of this application.

For ease of description, the network elements, the devices and the functional modules that are configured to perform the network functions, a chip system disposed inside the network elements and the devices, the network functions, and the like are collectively referred to as network functions in the following.

It should be noted that the core network of the communication system uses a service-based architecture. In other words, the foregoing different network functions may communicate with each other based on a client-server mode. An NF service consumer is also referred to as a client, and an NF service producer is also referred to as a function server, a server, or a service end. Specifically, control plane network functions such as the access and mobility management function, the session management function, the policy control function, and the unified data management function may interact with each other through service-oriented interfaces. For example, as shown in FIG. 5, a service-oriented interface provided by the access and mobility management function may be Namf, a service-oriented interface provided by the session management function may be Nsmf, a service-oriented interface provided by the policy control function may be Npcf, and a service-oriented interface provided by the unified data management function may be Nudm.

The access network device is a device that is located on a network side of the communication system and that has a wireless transceiver function, or a chip that can be disposed in the device. The access network device includes but is not limited to: an evolved NodeB (eNB), a radio network controller (RNC), a NodeB (NB), a base station controller (BSC), a base transceiver station (BTS), a home NodeB (for example, a home evolved NodeB, or a home NodeB, HNB), a baseband unit (BBU), an access point (AP) in a wireless fidelity (Wi-Fi) system, a wireless relay node, a wireless backhaul node, a transmission point (Transmission and Reception Point, TRP or Transmission Point, TP), or the like. Alternatively, the access network device may be a gNB or a transmission point (TRP or TP) in a 5G system such as a new radio (NR) system, or one antenna panel or a group of antenna panels (including a plurality of antenna panels) of a base station in a 5G system, or may be a network node, such as a baseband unit (BBU) or a distributed unit (DU), that constitutes a gNB or a transmission point.

The user equipment is a terminal device that accesses the communication system and that has the wireless transceiver function, or a chip that can be disposed in the terminal device. The user equipment may also be referred to as a user apparatus, an access terminal, a subscriber unit, a subscriber station, a mobile station, a remote station, a remote terminal, a mobile device, a user terminal, a terminal, a wireless communication device, a user agent, or a user apparatus. The terminal device in embodiments of this application may be a mobile phone, a tablet computer (Pad), a computer having a wireless transceiver function, a virtual reality (VR) terminal device, an augmented reality (AR) terminal device, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, or the like.

It should be understood that FIG. 5 is merely a simplified schematic diagram used as an example for ease of understanding. The communication system may further include another network device or another terminal device that is not shown in FIG. 5.

Figure 6:
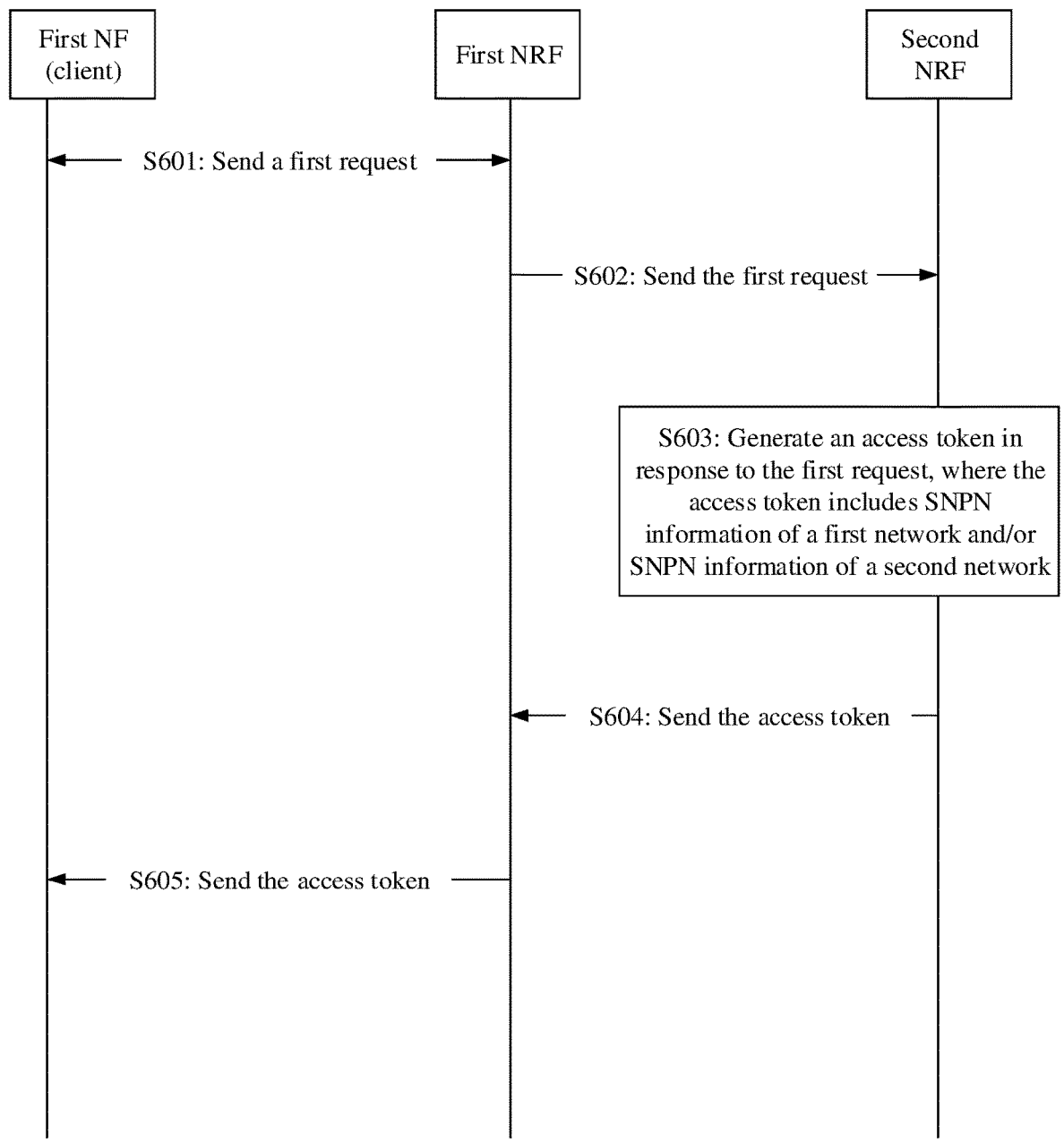
FIG. 6 is a flowchart of a service authorization method according to an embodiment of this application.

As shown in FIG. 6, an embodiment of this application provides a service authorization method. The method may be applied to the communication system shown in FIG. 5. The method includes the following steps.

S601: A first NF sends a first request to a first NRF, and the first NRF receives the first request.

The first NF is a client or an NF service consumer. For example, the first NF may be the SMF or the AMF in the communication system shown in FIG. 5.

The first request is used to request an access token, and the access token is used to access a service of a second NF in a second network. Specifically, the access token is an authorization credential used by the client to access the service of the second NF in the second network, and the client needs to have the access token to access the service of the second NF. The second NF is configured to provide a function service. For example, the second NF may be the AUSF, the UDM, the UPF, or the AF in the communication system shown in FIG. 5.

Both the first NF and the first NRF are located in a first network, and the second NF is located in the second network. The first request includes SNPN information of the first network and/or SNPN information of the second network.

It should be noted that SNPN information included in the first request needs to be determined based on a specific type of the first network and a specific type of the second network. For example, if a network type of the first network is an SNPN, and a network type of the second network is a PLMN, the first request includes the SNPN information of the first network, and may further include PLMN information of the second network. If a network type of the second network is an SNPN, and a network type of the first network is a PLMN, the first request includes the SNPN information of the second network, and may further include PLMN information of the first network. If a network type of the first network is an SNPN and a network type of the second network is also an SNPN, the first request includes both the SNPN information of the first network and the SNPN information of the second network.

In this embodiment, one SNPN may be identified by using a network identifier (Network ID, NID) and a public land mobile network identifier (PLMN ID). Correspondingly, if the network type of the first network is an SNPN, the SNPN information of the first network includes an NID and a PLMN ID of the first network; and if the network type of the second network is an SNPN, the SNPN information of the second network includes an NID and a PLMN ID of the second network.

Optionally, an NID and a PLMN ID may be carried in two different information elements respectively, or may be carried in one information element in a combination form. This is not limited herein. For example, a combination of the NID and the PLMN ID is carried in an information element in which the PLMN ID is originally located, to reduce resource overheads.

Optionally, the first request further includes at least one of the following parameters: an expected service name and type, a client identifier, a client (namely, the first NF) function type, and the like.

In addition, it may be understood that before the first NF sends the first request to the first NRF, the first NF needs to register with the first NRF, initiate a service discovery request process to the first NRF, and obtain instance information of the second NF based on service discovery before sending the first request.

S602: The first NRF forwards the first request to a second NRF.

The second NRF is located in the second network. The first NRF may directly forward the first request to the second NRF, or the first NRF may perform reassembly and conversion on the first request, and then forward the first request to the second NRF. This is not limited herein.

Optionally, the first NRF may authenticate the first NF, and after authenticating that an identity of the first NF is valid, forward the first request to the second NRF.

In addition, it may be understood that before the first NRF forwards the first request to the second NRF, the first NRF and the second NRF need to perform mutual authentication. Specifically, the first NRF and the second NRF may perform the mutual authentication by using a certificate.

S603: In response to the first request, the second NRF authorizes the first NF and generates an access token, where the access token includes the SNPN information of the first network and/or the SNPN information of the second network.

It may be understood that SNPN information in the access token is consistent with the SNPN information carried in the first request. For example, if the network type of the first network is an SNPN, and the network type of the second network is a PLMN, the access token carries the SNPN information of the first network, and may further carry the PLMN information of the second network. If the network type of the second network is an SNPN, and the network type of the first network is a PLMN, the access token carries the SNPN information of the second network, and may further carry the PLMN information of the first network. If the network type of the first network is an SNPN, and the network type of the second network is also an SNPN, the access token carries the SNPN information of the first network and the SNPN information of the second network.

Optionally, the access token may further include other information, for example, the first NF function type, a second NF function type, a validity period or an expiration date (used to indicate when the access token expires), the expected service name, an instance identifier of the second NRF, and an instance identifier of the second NF.

Optionally, before generating the access token, the second NRF may authenticate the first NF, and after authenticating that the identity of the first NF is valid, the second NRF authorizes the first NF and generates the access token for the first NF.

Optionally, after generating the access token, the second NRF may further perform integrity protection on the access token, for example, add a digital signature or a message authentication code.

S604: The second NRF sends the access token to the first NRF, and the first NRF receives the access token from the second NRF.

S605: The first NRF sends the access token to the first NF, and the first NF receives the access token from the first NRF.

It can be learned from the foregoing that according to the technical solution provided in this embodiment, when the first network is an SNPN network, the first NF adds the SNPN information of the first network to the first request, or when the second network is an SNPN network, the first NF adds the SNPN information of the second network to the first request. In this way, both a network that requests an access token and a network that is requested for an access token in a service authorization process can be uniquely identified, and this ensures that a process in which the first NF requests the access token can be successfully completed, and improves service authorization reliability. In addition, the access token also carries corresponding SNPN information, to specify a service consumer and a service producer authorized by the access token, and this further improves service authorization reliability.

Figure 7:
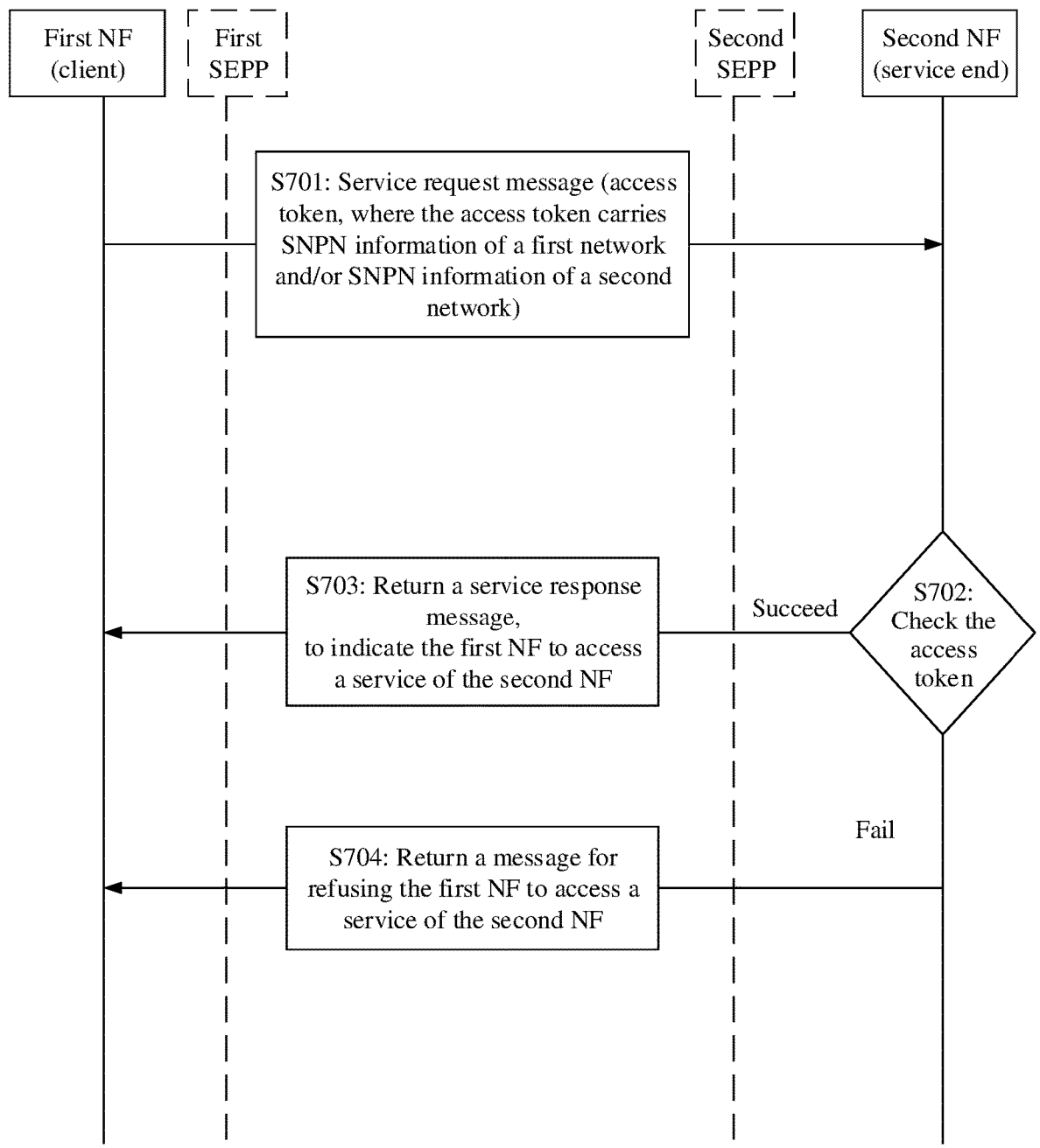
FIG. 7 is a flowchart of a service request method according to an embodiment of this application.

As shown in FIG. 7, based on FIG. 6, an embodiment of this application further provides a service request method. The method is applicable to the communication system shown in FIG. 5. The method includes the following steps.

S701: A first NF sends a service request message to a second NF.

The first NF is located in a first network, and the second NF is located in a second network. A network type of at least one of the first network and the second network is an SNPN.

The service request message is used to request a service of the second NF, and the service request message carries an access token.

It may be understood that the access token that is included by the first NF in the service request message is issued by a second NRF to the first NF (for a specific process, refer to the embodiment shown in FIG. 6). Therefore, the access token may carry SNPN information of the first network and/or SNPN information of the second network, and specific SNPN information in the access token is determined based on a type of the first network and a type of the second network.

For ease of description, in this embodiment, the SNPN information of the first network carried in the access token is referred to as a first SNPN, and the SNPN information of the second network carried in the access token is referred to as a second SNPN.

Optionally, the service request message may further carry a service scope requested by the first NF.

Further optionally, the service request message may further carry network information of the first NF (that is, network information of the first network). For example, if the type of the first network is an SNPN, the service request message further carries SNPN information of the first NF (a service requester) in addition to the access token. If the type of the first network is a PLMN, the service request message further carries PLMN information of the first NF (a service requester) in addition to the access token.

S702: The second NF checks the access token, and if check on the access token succeeds, performs S703, or if check on the access token fails, performs S704.

The check on the access token performed by the second NF includes check on the SNPN information in the access token. Specifically, the check includes check on whether first SNPN information and/or second SNPN information exist/ exists in the access token; and if the first SNPN information and/or the second SNPN information exist/exists, the first SNPN information and/or the second SNPN information are/is further checked.

For example, if the access token includes the first SNPN information, the second NF further determines whether the SNPN information of the first NF carried in the service request message matches the first SNPN information in the access token. If the SNPN information of the first NF carried in the service request message matches the first SNPN information in the access token, check succeeds. If the SNPN information of the first NF carried in the service request message does not match the first SNPN information in the access token, check fails. If the access token includes the second SNPN information, the second NF further determines whether SNPN information of the second NF matches the second SNPN information in the access token. If the SNPN information of the second NF matches the second SNPN information in the access token, check succeeds. If the SNPN information of the second NF does not match the second SNPN information in the access token, check fails. If the access token includes the first SNPN information and the second SNPN information, the second NF further determines whether the SNPN information of the first NF carried in the service request message matches the first SNPN information in the access token, and determines whether SNPN information of the second NF matches the second SNPN information in the access token. If the SNPN information of the first NF carried in the service request message matches the first SNPN information in the access token and the SNPN information of the second NF matches the second SNPN information in the access token, check succeeds. If the SNPN information of the first NF carried in the service request message does not match the first SNPN information in the access token and the SNPN information of the second NF does not match the second SNPN information in the access token, check fails.

Optionally, the check on the access token performed by the second NF may further include check on the service scope requested by the first NF, for example, determining whether the service scope requested by the first NF exceeds a service scope recorded in the access token.

Optionally, the check on the access token performed by the second NF may further include check on integrity of the access token or the service request message, to determine whether the access token or the service request message is complete.

Optionally, the check on the access token performed by the second NF may further include check on an expiration date in the access token, to determine whether the access token expires.

It should be noted that, if check in a plurality of dimensions exists, step S703 can be performed only after the check in the plurality of dimensions succeeds. For example, the plurality of dimensions may be understood as at least two dimensions, for example, a dimension of SNPN information check, a dimension of integrity check, a dimension of service scope check, and a dimension of expiration date check.

S703: The second NF returns a service response message to the first NF in response to the service request of the first NF, to indicate the first NF to access a service of the second NF.

S704: The second NF returns, to the first NF, a message for refusing the first NF to access a service of the second NF, or does not return a service response message.

It can be learned from the foregoing that, according to the technical solution provided in this embodiment, when the first network is an SNPN network, an authorization token carries the SNPN information of the first network, or when the second network is an SNPN network, an authorization token carries the SNPN information of the second network. In this way, a network of the service requester and a network of a requested party can be uniquely identified in a service request process, and this ensures that a service request process of the first NF can be successfully completed, improves reliability of a service, and improves network security by preventing malicious attacks.

It may be understood that, in this embodiment, the first NF and the second NF are respectively located in different networks. Therefore, the first NF and the second NF need to exchange messages by using a SEPP, to perform security protection on signaling between the first network and the second network. For ease of description, herein, a SEPP in the first network is referred to as a first SEPP, and a SEPP in the home network is referred to as a second SEPP, as shown by dashed-line boxes in FIG. 7.

Figure 8:
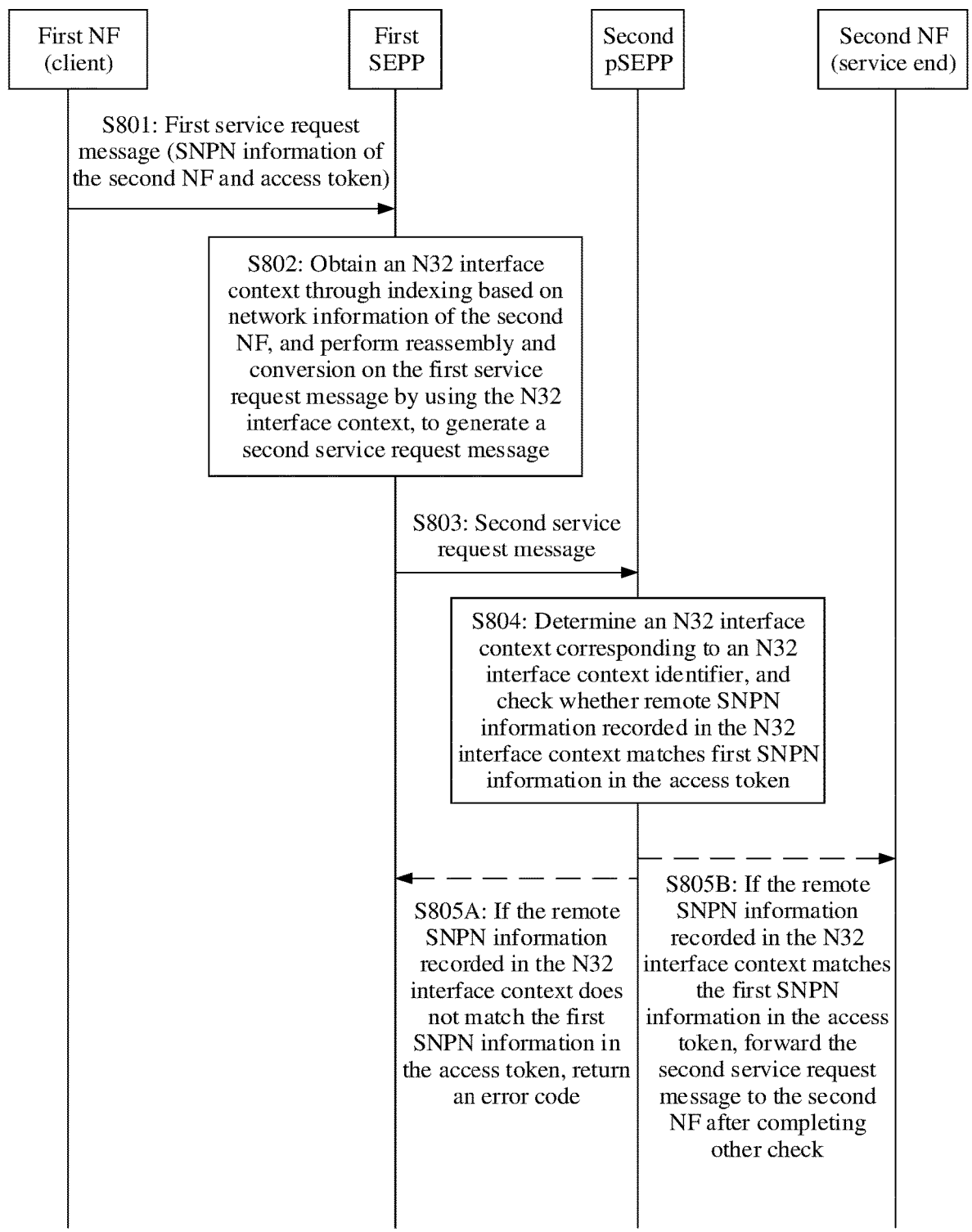
FIG. 8 is a flowchart of another service request method according to an embodiment of this application.

As shown in FIG. 8, based on FIG. 7, an embodiment of this application further provides a service request method that includes the following steps.

S801: A first NF sends a first service request message to a first SEPP, and the first SEPP receives the first service request message.

Both the first NF and the first SEPP are located in a first network, the first service request message is used to request a service of a second NF, and the first service request message carries an access token and network information of a target access object (namely, the second NF). For a specific implementation of the access token herein, refer to the foregoing specific implementation of the access token. Details are not described herein again.

S802: The first SEPP generates a second service request message based on the first service request message, where the second service request message carries an N32 interface context identifier and the access token.

In this embodiment, the first SEPP and a second SEPP exchange messages through an N32 interface. Therefore, before the first SEPP and the second SEPP exchange the messages, the first SEPP and the second SEPP first establish an N32 interface connection. When establishing an N32-c connection, the first SEPP and the second SEPP negotiate and establish N32-f contexts, and an N32-f context of the first SEPP or the second SEPP records SEPP information of a peer end.

SEPP information recorded in an N32 interface context includes at least network information, and the network information may be specifically recorded in N32-f peer information in the N32-f context. For example, it is assumed that both the first network and a second network are SNPN networks, the N32-f context of the first SEPP includes SNPN information (PLMN ID+NID) of the second network, and the N32-f context of the second SEPP includes SNPN information (PLMN ID+NID) of the first network. Certainly, by way of example, and not limitation, if a peer network is a PLMN network, the N32-f context may record PLMN information of the peer network.

The first SEPP and the second SEPP preset network information of the peer end in, but not limited to, the following two manners:

Manner 1: Reuse an existing interface establishment message. In a first procedure for establishing the N32-c connection between SEPPs, SNPN information of each SEPP is carried in two messages in the procedure. For example, a SEPP (which may be the first SEPP or the second SEPP) that initiates establishment of the N32-c connection sends a capability exchange message to a peer SEPP, where the capability exchange message carries SNPN information of the SEPP. When the peer SEPP returns a response message, the response message carries SNPN information of the peer SEPP. Certainly, herein, network types of the first SEPP and the second SEPP use SNPNs as an example, but the network types are not limited thereto actually, and may alternatively be another network type. For example, if the network type of the second SEPP is a PLMN, the response message carries PLMN information of the second SEPP.

Manner 2: Generate a new message dedicated to exchanging network information of SEPPs. For example, the first SEPP generates and sends a dedicated exchange request message to the second SEPP, where the dedicated exchange request message carries SNPN information of the first SEPP, and then the second SEPP responds to the exchange request message and returns SNPN information of the second SEPP to the first SEPP. Certainly, the second SEPP may alternatively initiate a dedicated exchange request message, and the first SEPP responds to the message. This is not limited herein.

When the first SEPP generates the second service request message based on the first service request message, the first SEPP obtains the N32 interface context between the first SEPP and the second SEPP through indexing based on the network information of the target access object (namely, the second NF) carried in the first service request message, and then performs reassembly and conversion on the first service request message by using the N32 interface context, to generate the second service request message. The second service request message carries the access token and the N32 interface context identifier.

Optionally, a specific implementation of the reassembly and conversion includes but is not limited to: performing integrity protection (for example, adding a digital signature or a message authentication code) on the first service request message, adding metadata, or the like. It may be understood that valid data before and after the reassembly and conversion remains unchanged, for example, an access token and a service request scope.

S803: The first SEPP sends the second service request message to the second SEPP, and the second SEPP receives the second service request message.

S804: The second SEPP determines an N32 interface context corresponding to the N32 interface context identifier, and if the first network is an SNPN network, the second SEPP checks whether remote SNPN information recorded in the N32 interface context matches first SNPN information in the access token.

Alternatively, if the first network is a PLMN network, the second SEPP checks whether remote PLMN information recorded in the N32 interface context matches first PLMN information in the access token.

S805A: If the remote SNPN information does not match the SNPN information of the first network, the second SEPP returns an error code to the first SEPP.

S805B: If the remote SNPN information recorded in the N32 interface context matches the first SNPN information in the access token, the second SEPP forwards the second service request message to the second NF after completing other check (for example, integrity check, service scope check, and validity period check) on the access token. It should be understood that forwarding herein may be direct forwarding, or may be forwarding after the reassembly and conversion on the second service request message. This is not limited herein.

It can be learned from the foregoing that in the technical solution provided in this embodiment, when the first network is SNPN information, the second SEPP in the second network presets the SNPN information of the first SEPP in the N32 interface context: or when the second network is SNPN information, the first SEPP in the first network presets SNPN information of the second SEPP in the N32 interface context. In this way, security protection can be performed on signaling between the first network and the second network, and this can further improve network security.

Figure 9:
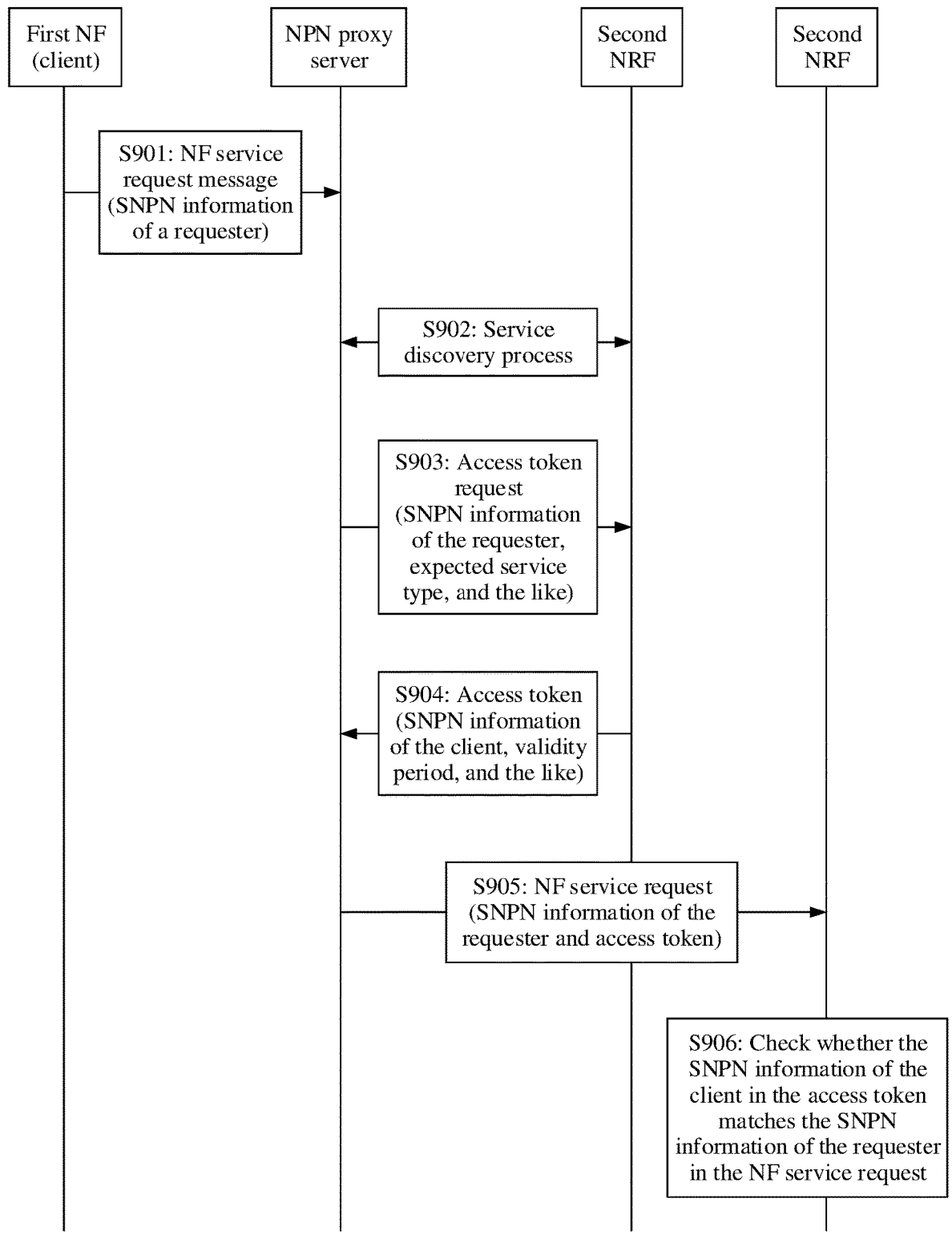
FIG. 9 is a flowchart of a service discovery, service authorization, and service request method according to an embodiment of this application.

As shown in FIG. 9, based on FIG. 6 to FIG. 8, an embodiment of this application further provides a service discovery, service authorization, and service request method. The method is applicable to the communication system shown in FIG. 5. Different from the embodiments shown in FIG. 6 to FIG. 8, in this embodiment, on behalf of a first NF (client), an NPN proxy server performs processes such as service discovery, service authorization, and a service request. It should be understood that the NPN proxy server is located in a second network (home network), namely, a network in which a second NF (NF service producer) is located.

S901: The first NF sends an NF service request message to the NPN proxy server.

The first NF is located in a first network, and the NF service request message herein carries SNPN information (for example, an NID of the first network) of a requester (namely, the first NF).

S902: The NPN proxy server, on behalf of the first NF, initiates a service discovery process to a second NRF.

S903: The NPN proxy server, on behalf of the first NF, initiates an access token request to the second NRF.

The access token request carries the SNPN information of the requester (namely, the first NF), and may further carry an expected service type and the like.

S904: The second NRF returns an access token to the NPN proxy server.

The access token carries SNPN information of the client, and may further carry an authorized service scope and the like.

S905: The NPN proxy server initiates a service request to the second NF, where the request carries the SNPN information of the requester, the access token, and the like.

S906: The second NF checks whether the SNPN information of the client in the access token matches the SNPN information of the requester in the NF service request in S905. If the SNPN information of the client in the access token matches the SNPN information of the requester in the NF service request, the service request process continues. If the SNPN information of the client in the access token does not match the SNPN information of the requester in the NF service request, the service request is rejected.

It can be learned from the foregoing that in the technical solution of this embodiment, the NPN proxy server in the second network, on behalf of the first NF in the first network, performs the processes such as the service discovery, the service authorization, and the service request to the second NF in the second network, so that an interaction procedure can be further simplified, interaction efficiency can be improved, and complexity of the client can be reduced.

It should be understood that the foregoing embodiments may be combined with each other to achieve different technical effects.

The methods provided in embodiments of this application are described above in detail with reference to FIG. 6 to FIG.

9. Apparatuses provided in embodiments of this application are described below in detail with reference to FIG. 10 to FIG. 16.

Figure 10:
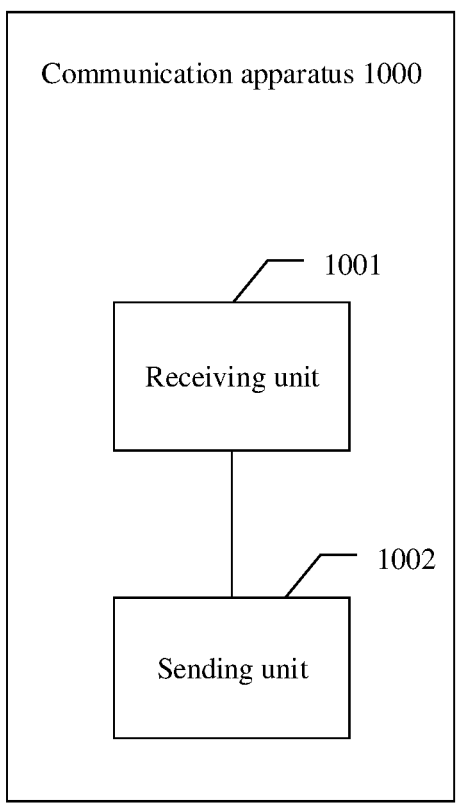
FIG. 10 is a schematic diagram of a structure of a communication apparatus 1000 according to an embodiment of this application.

Based on a same technical concept, with reference to FIG. 10, an embodiment of this application provides a communication apparatus 1000. The apparatus may have functions implemented by the first NRF in the foregoing method embodiments. The apparatus may be the first NRF, or may be an apparatus in the first NRF. The functions may be implemented by hardware, or hardware executing corresponding software. The hardware or the software includes one or more modules corresponding to the foregoing functions. The apparatus includes:
- a receiving unit 1001, configured to receive a first request from a first network function (NF), where the first NF and the apparatus are located in a first network, the first request is used to request an access token, the access token is used to access a service of a second NF in a second network, and the first request includes standalone non-public network (SNPN) information of the first network and/or SNPN information of the second network; and
- a sending unit 1002, configured to forward the first request to a second NRF, where the second NRF is located in the second network.

The receiving unit 1001 is further configured to receive an access token from the second NRF. The sending unit is further configured to send the access token to the first NF.

Optionally, the SNPN information of the first network includes a network identifier (NID) and a public land mobile network identifier (PLMN ID), and/or the SNPN information of the second network includes an NID and a PLMN ID.

Figure 11:
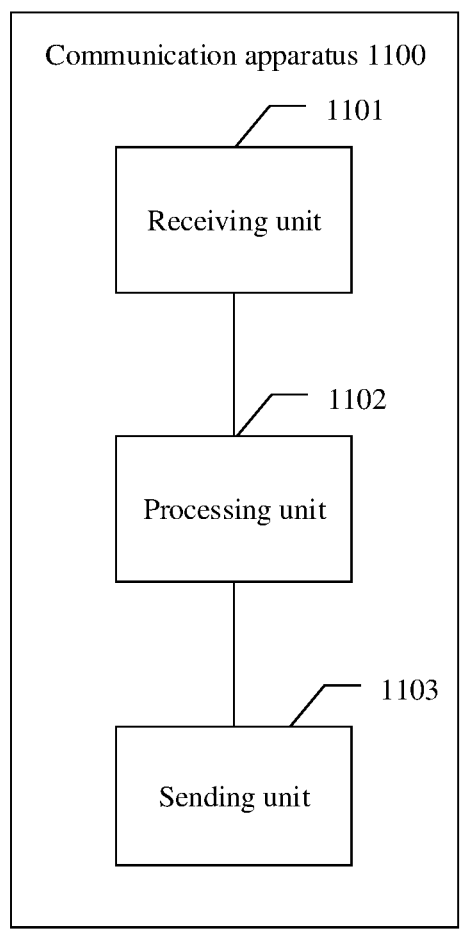
FIG. 11 is a schematic diagram of a structure of a communication apparatus 1100 according to an embodiment of this application.

Based on the same technical concept, with reference to FIG. 11, an embodiment of this application provides a communication apparatus 1100. The apparatus may have functions implemented by the second NRF in the foregoing method embodiments. The apparatus may be the second NRF, or may be an apparatus in the second NRF. The functions may be implemented by hardware, or hardware executing corresponding software. The hardware or the software includes one or more modules corresponding to the foregoing functions. The apparatus includes:
- A receiving unit 1101, configured to receive a first request from a first NRF, where the first NRF is located in a first network, the apparatus is located in a second network, the first request is used to request an access token, the access token is used to access a service of a second network function (NF) in the second network, and the first request includes standalone non-public network (SNPN) information of the first network and/or SNPN information of the second network:
- a processing unit 1102, configured to generate an access token in response to the first request, where the access token includes the SNPN information of the first network and/or the SNPN information of the second network; and
- a sending unit 1103, configured to send the access token to the first NRF.

Optionally, the SNPN information of the first network includes a network identifier (NID) and a public land mobile network identifier (PLMN ID), and/or the SNPN information of the second network includes an NID and a PLMN ID.

Figure 12:
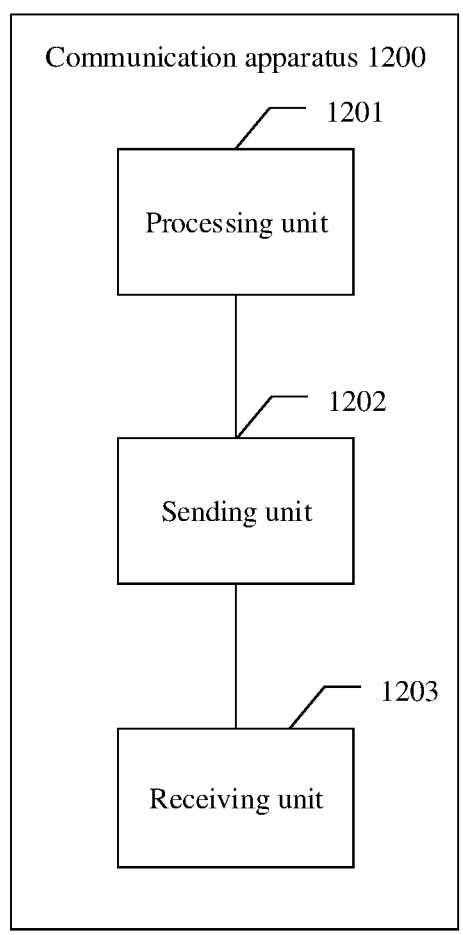
FIG. 12 is a schematic diagram of a structure of a communication apparatus 1200 according to an embodiment of this application.

Based on the same technical concept, with reference to FIG. 12, an embodiment of this application provides a communication apparatus 1200. The apparatus may have functions implemented by the first NF in the foregoing method embodiments. The apparatus may be the first NF, or may be an apparatus in the first NF. The functions may be implemented by hardware, or hardware executing corresponding software. The hardware or the software includes one or more modules corresponding to the foregoing functions. The apparatus includes:
- a processing unit 1201, configured to generate a first request, where the apparatus is located in a first network, the first request is used to request an access token, the access token is used to access a service of a second NF in a second network, and the first request includes standalone non-public network (SNPN) information of the first network and/or SNPN information of the second network;
- a sending unit 1202, configured to send the first request to a first network repository function (NRF), where the first NRF is located in the first network; and
- a receiving unit 1203, configured to receive an access token, where the access token includes the SNPN information of the first network and/or the SNPN information of the second network.

Optionally, the SNPN information of the first network includes a network identifier (NID) and a public land mobile network identifier (PLMN ID), and/or the SNPN information of the second network includes an NID and a PLMN ID.

Optionally, the sending unit 1202 is further configured to send a first service request message to a first security edge protection proxy (SEPP), where the first SEPP is located in the first network, and the first service request message carries the access token.

Optionally, the sending unit 1202 is further configured to send a service request message to the second NF, where the service request message is used to request the service of the second NF, and the service request message carries the access token and the SNPN information of the first network.

Figure 13:
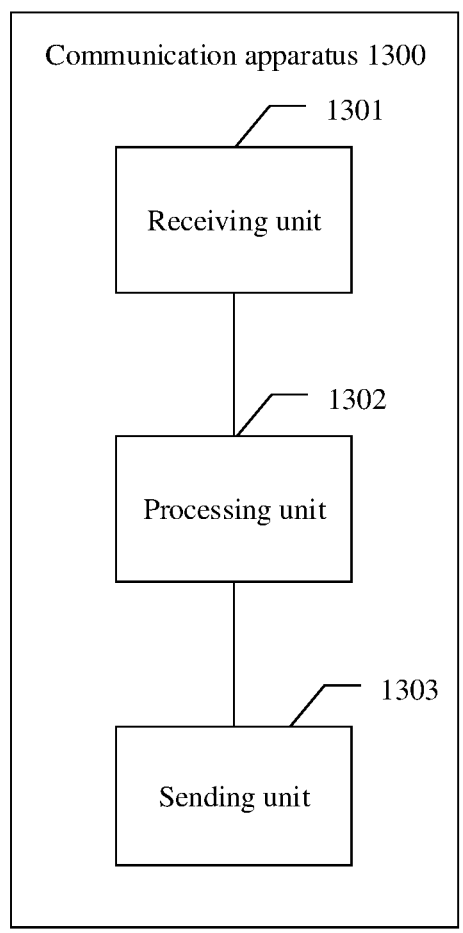
FIG. 13 is a schematic diagram of a structure of a communication apparatus 1300 according to an embodiment of this application.

Based on the same technical concept, with reference to FIG. 13, an embodiment of this application provides a communication apparatus 1300. The apparatus may have functions implemented by the second NF in the foregoing method embodiments. The apparatus may be the second NF, or may be an apparatus in the second NF. The functions may be implemented by hardware, or hardware executing corresponding software. The hardware or the software includes one or more modules corresponding to the foregoing functions. The apparatus includes:
- a receiving unit 1301, configured to receive a service request message from a first NF, where the first NF is located in a first network, the apparatus is located in a second network, the service request message is used to request a service of the apparatus, the service request message carries an access token and standalone non-public network (SNPN) information of the first network, and the access token includes the SNPN information of the first network and/or SNPN information of the second network;
- a processing unit 1302, configured to check the access token; and
- a sending unit 1303, configured to return a service response message to the first NF when check on the access token succeeds.

Optionally, the SNPN information of the first network includes a network identifier (NID) and a public land mobile network identifier (PLMN ID), and/or the SNPN information of the second network includes an NID and a PLMN ID.

Optionally, the processing unit 1302 is specifically configured to: check whether the SNPN information of the second network in the access token matches SNPN information of the apparatus and/or check whether the SNPN information of the first network in the access token matches the SNPN information of the first network carried in the service request message.

Figure 14:
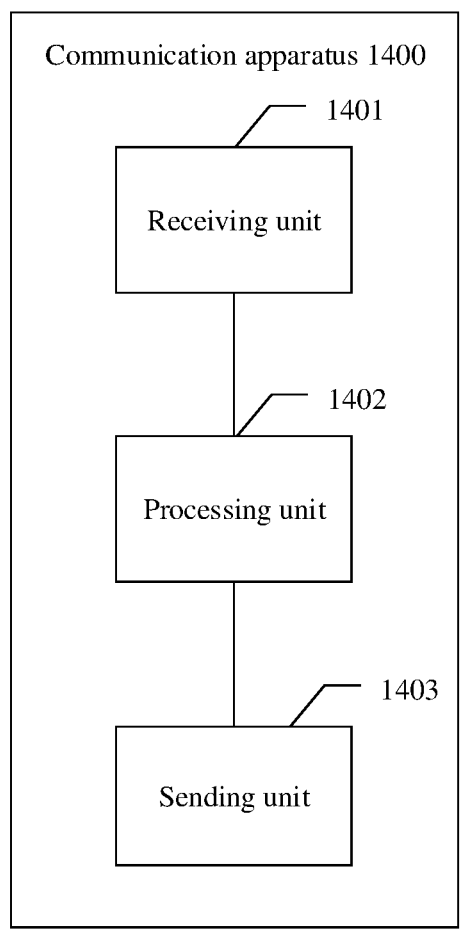
FIG. 14 is a schematic diagram of a structure of a communication apparatus 1400 according to an embodiment of this application.

Based on the same technical concept, with reference to FIG. 14, an embodiment of this application provides a communication apparatus 1400. The apparatus may have functions implemented by the first SEPP in the foregoing method embodiments. The apparatus may be the first SEPP, or may be an apparatus in the first SEPP. The functions may be implemented by hardware, or hardware executing corresponding software. The hardware or the software includes one or more modules corresponding to the foregoing functions. The apparatus includes:

a receiving unit 1401, configured to receive a first service request message from a first network function (NF), where the apparatus is located in a first network, the first service request message carries an access token, and the access token includes SNPN information of the first network and/or SNPN information of a second network;

a processing unit 1402, configured to generate a second service request message based on the first service request message; and a sending unit 1403, configured to send the second service request message to a second SEPP, where the second SEPP is located in the second network, and the second service request message carries an N32 interface context identifier and the access token.

Optionally, the SNPN information of the first network includes a network identifier (NID) and a public land mobile network identifier (PLMN ID), and/or the SNPN information of the second network includes an NID and a PLMN ID.

Figure 15:
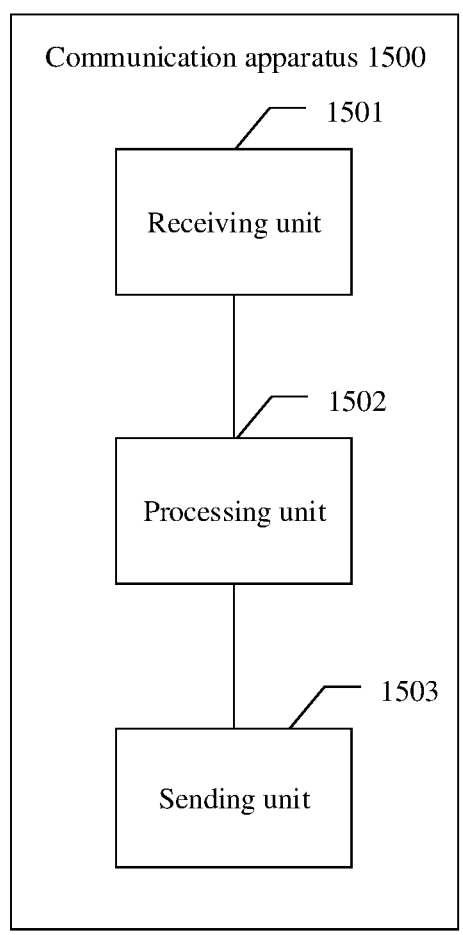
FIG. 15 is a schematic diagram of a structure of a communication apparatus 1500 according to an embodiment of this application.

Based on the same technical concept, with reference to FIG. 15, an embodiment of this application provides a communication apparatus 1500. The apparatus may have functions implemented by the second SEPP in the foregoing method embodiments. The apparatus may be the second SEPP, or may be an apparatus in the second SEPP. The functions may be implemented by hardware, or hardware executing corresponding software. The hardware or the software includes one or more modules corresponding to the foregoing functions. The apparatus includes:

a receiving unit 1501, configured to receive a second service request message from a first SEPP, where the first SEPP is located in a first network, the apparatus is located in a second network, the second service request message carries an N32 interface context identifier and an access token, and the access token includes SNPN information of the first network and/or SNPN information of the second network;

a processing unit 1502, configured to: determine an N32 interface context corresponding to the N32 interface context identifier, and check whether remote SNPN information recorded in the N32 interface context matches the SNPN information of the first network; and a sending unit 1503, configured to return an error code to the first SEPP when the remote SNPN information does not match the SNPN information of the first network.

Optionally, the SNPN information of the first network includes a network identifier (NID) and a public land mobile network identifier (PLMN ID), and/or the SNPN information of the second network includes an NID and a PLMN ID.

Figure 16:
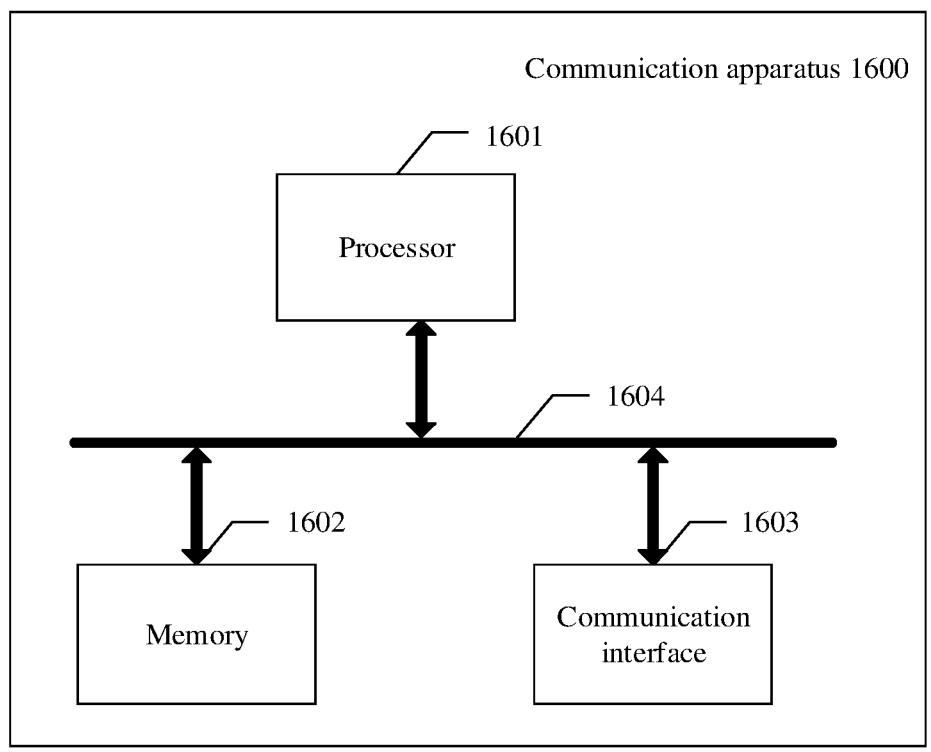
FIG. 16 is a schematic diagram of a structure of a communication apparatus 1600 according to an embodiment of this application.

Based on the same technical concept, with reference to FIG. 16, an embodiment of this application further provides a communication apparatus 1600. The apparatus includes:

at least one processor 1601; and a memory 1602 and a communication interface 1603 that are communicatively connected to the at least one processor 1601.

The memory 1602 stores instructions that can be executed by the at least one processor 1601, and the at least one processor 1601 executes the instructions stored in the memory 1602, to perform a method performed by any network element in the foregoing method embodiments.

The processor 1601 and the memory 1602 may be coupled by using an interface circuit, or may be integrated together. This is not limited herein.

A specific connection medium between the processor 1601, the memory 1602, and the communication interface 1603 is not limited in this embodiment of this application. In this embodiment of this application, the processor 1601, the memory 1602, and the communication interface 1603 are connected through a bus 1604 in FIG. 16, and the bus is represented by a thick line in FIG. 16. A connection manner between other components is only schematically described, and is not limited thereto. The bus may be classified into an address bus, a data bus, a control bus, and the like. For ease of representation, only one thick line is used to represent the bus in FIG. 16, but this does not mean that there is only one bus or only one type of bus.

It should be understood that the processor mentioned in embodiments of this application may be implemented by hardware or may be implemented by software. When being implemented by the hardware, the processor may be a logic circuit, an integrated circuit, or the like. When being implemented by the software, the processor may be a general-purpose processor, and is implemented by reading software code stored in a memory.

For example, the processor may be a central processing unit (CPU), or may be another general-purpose processor, a digital signal processor (DSP), an application-specific integrated circuit (ASIC), or a field programmable gate array (FPGA) or another programmable logic device, a discrete gate or a transistor logic device, a discrete hardware component, or the like. The general-purpose processor may be a microprocessor, or the processor may be any conventional processor or the like.

It may be understood that the memory mentioned in embodiments of this application may be a volatile memory or a non-volatile memory, or may include a volatile memory and a non-volatile memory. The non-volatile memory may be a read-only memory (ROM), a programmable read-only memory (PROM), an erasable programmable read-only memory (Erasable PROM, EPROM), an electrically erasable programmable read-only memory (Electrically EPROM, EEPROM), or a flash memory. The volatile memory may be a random access memory (RAM), and is used as an external cache. By way of example, and not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM).

It should be noted that when the processor is a general-purpose processor, a DSP, an ASIC, an FPGA, another programmable logic device, a discrete gate or a transistor logic device, or a discrete hardware component, the memory (storage module) may be integrated into the processor.

It should be noted that the memory described in this specification aims to include but is not limited to these memories and any memory of another proper type.

Based on the same technical concept, an embodiment of this application further provides a computer-readable storage medium, including a program or instructions. When the program or the instructions are run on a computer, a method performed by any network element in the foregoing method embodiments is performed.

Based on the same technical concept, an embodiment of this application further provides a chip. The chip is coupled to a memory, and is configured to read and execute program instructions stored in the memory, to implement a method performed by any network element in the foregoing method embodiments.

Based on the same technical concept, an embodiment of this application further provides a computer program product, including instructions. When the computer program product runs on a computer, the computer is enabled to perform a method performed by any network element in the foregoing method embodiments.

It should be understood that all related content of the steps in the foregoing method embodiments may be cited in function descriptions of the corresponding functional modules. Details are not described herein again.

Embodiments of this application are described with reference to the flowcharts and/or the block diagrams of the methods, the device (system), and the computer program product according to embodiments of this application. It should be understood that computer program instructions may be used to implement each process and/or each block in the flowcharts and/or the block diagrams and a combination of a process and/or a block in the flowcharts and/or the block diagrams. The computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

All or a part of the foregoing embodiments may be implemented by software, hardware, firmware, or any combination thereof. When software is used to implement embodiments, all or a part of embodiments may be implemented in a form of a computer program product. The computer program product includes one or more computer instructions. When the computer program instructions are loaded and executed on the computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to a computer, or a data storage device integrating one or more usable media, for example, a server or a data center. The usable medium may be a magnetic medium (for example, a floppy disk, a hard disk, or a magnetic tape), an optical medium (for example, a digital versatile disc (DVD)), a semiconductor medium (for example, a solid state disk (SSD)), or the like.

Clearly, a person skilled in the art can make various modifications and variations to embodiments of this application without departing from the spirit and scope of this application. In this case, this application is intended to cover these modifications and variations of embodiments of this application provided that they fall within the scope of protection defined by the following claims and their equivalent technologies.

What is claimed is:

1. A service authorization method, comprising:
   receiving, by a first network repository function (NRF), a first request from a first network function (NF), wherein the first NF and the first NRF are located in a first network, the first request requests an access token, the access token is for accessing a service of a second NF in a second network, and the first request comprises standalone non-public network (SNPN) information of the first network and/or SNPN information of the second network;
   forwarding, by the first NRF, the first request to a second NRF, wherein the second NRF is located in the second network;
   generating, by the second NRF, an access token in response to the first request, wherein the access token comprises the SNPN information of the first network and/or the SNPN information of the second network;
   sending, by the second NRF, the access token to the first NRF;
   receiving, by the first NRF, the access token from the second NRF; and
   sending, by the first NRF, the access token to the first NF, wherein the SNPN information of the first network comp work identifier (NID) and a public land mobile network identifier (PLMN ID), and/or the SNPN information of the second network comprises an NID and a PLMN ID.

2. The method according to claim 1, further comprising:
   sending, by the first NF, a first service request message to a first security edge protection proxy (SEPP), wherein the first SEPP is located in the first network, and the first service request message carries the access token;
   generating, by the first SEPP, a second service request message based on the first service request message;
   sending, by the first SEPP, the second service request message to a second SEPP, wherein the second SEPP is located in the second network, and the second service request message carries an N32 interface context identifier and the access token;
   determining, by the second SEPP, an N32 interface context corresponding to the N32 interface context identifier;
   checking, by the second SEPP, whether remote SNPN information recorded in the N32 interface context matches the SNPN information of the first network; and
   when the remote SNPN information does not match the SNPN information of the first network, returning, by the second SEPP, an error code to the first SEPP.

3. The method according to claim 1, further comprising:
   sending, by the first NF, a service request message to the second NF, wherein the service request message requests the service of the second NF, and the service request message carries the access token and standalone non-public network (SNPN) information of the first network;
checking, by the second NF, the access token; and
when the checking of the access token succeeds, returning, by the second NF, a service response message to the first NF.

4. The method according to claim 3, wherein the checking of the access token comprises:
checking, by the second NF, whether the SNPN information of the second network in the access token matches SNPN information of the second NF and/or checking, by the second NF, whether the SNPN information of the first network in the access token matches the SNPN information of the first network carried in the service request message.

5. A service authorization system, comprising:
a first network function (NF), configured to send a first request;
a first network repository function (NRF), configured to: receive the first request from the first NF, wherein the first NF and the first NRF are located in a first network, the first request requests an access token, the access token is for accessing a service of a second NF in a second network, and the first request comprises standalone non-public network (SNPN) information of the first network and/or SNPN information of the second network, and forward the first request to a second NRF, wherein the second NRF is located in the second network; and
the second NRF, configured to: receive the first request, generate an access token in response to the first request, wherein the access token comprises the SNPN information of the first network and/or the SNPN information of the second network, and send the access token to the first NRF, wherein
the first NRF is further configured to: receive the access token from the second NRF, and send the access token to the first NF; and
the first NF is further configured to receive the access token,
wherein the SNPN information of the first network comprises a network identifier (NID) and a public land mobile network identifier (PLMN ID), and/or the SNPN information of the second network comprises an NID and a PLMN ID.

6. The system according to claim 5, further comprising a first security edge protection proxy (SEPP) and a second SEPP;
the first NF is further configured to send a first service request message to the first SEPP, wherein the first SEPP is located in the first network, and the first service request message carries the access token;
the first SEPP is configured to: generate a second service request message based on the first service request message, and send the second service request message to the second SEPP, wherein the second SEPP is located in the second network, and the second service request message carries an N32 interface context identifier and the access token;
the second SEPP is configured to: receive the second service request message, determine an N32 interface context corresponding to the N32 interface context identifier, and check whether remote SNPN information recorded in the N32 interface context matches the SNPN information of the first network; and when the remote SNPN information does not match the SNPN information of the first network, the second SEPP is further configured to return an error code to the first SEPP.

7. The system according to claim 5, wherein
the first NF is further configured to send a service request message to the second NF, wherein the service request message requests the service of the second NF, and the service request message carries the access token and standalone non-public network (SNPN) information of the first network; and
the second NF is further configured to: check the access token, and when the checking of the access token succeeds, return a service response message to the first NF.

8. The system according to claim 7, wherein the checking of the access token comprises:
checking whether the SNPN information of the second network in the access token matches SNPN information of the second NF and/or checking whether the SNPN information of the first network in the access token matches the SNPN information of the first network carried in the service request message.

9. A communication apparatus, comprising:
a receiver, configured to receive a first request from a first network function (NF), wherein the first NF and the apparatus are located in a first network, the first request requests an access token, the access token is for accessing a service of a second NF in a second network, and the first request comprises standalone non-public network (SNPN) information of the first network and/or SNPN information of the second network; and
a transmitter, configured to forward the first request to a second NRF, wherein the second NRF is located in the second network, wherein
the receiver is further configured to receive an access token from the second NRF, and
the transmitter is further configured to send the access token to the first NF,
wherein the SNPN information of the first network comprises a network identifier (NID) and a public land mobile network identifier (PLMN ID), and/or the SNPN information of the second network comprises an NID and a PLMN ID.

10. The apparatus according to claim 9, wherein
the transmitter is further configured to send a first service request message to a first security edge protection proxy (SEPP), wherein the first SEPP is located in the first network, and the first service request message carries the access token;
the first SEPP is configured to generate a second service request message based on the first service request message;
the first SEPP is further configured to send the second service request message to a second SEPP, wherein the second SEPP is located in the second network, and the second service request message carries an N32 interface context identifier and the access token;
the second SEPP is configured to determine an N32 interface context corresponding to the N32 interface context identifier;
the second SEPP is further configured to check whether remote SNPN information recorded in the N32 interface context matches the SNPN information of the first network; and when the remote SNPN information does not match the SNPN information of the first network, the second SEPP is further configured to return an error code to the first SEPP.

11. The apparatus according to claim 9, wherein
the first NF is further configured to send a service request message to the second NF, wherein the service request message requests the service of the second NF, and the service request message carries the access token and standalone non-public network (SNPN) information of the first network;
the second NF is configured to check the access token; and
when the checking of the access token succeeds, the second NF is further configured to return a service response message to the first NF.

12. The apparatus according to claim 11, wherein the checking of the access token comprises:
checking whether the SNPN information of the second network in the access token matches SNPN information of the second NF and/or checking whether the SNPN information of the first network in the access token matches the SNPN information of the first network carried in the service request message.

13. The method according to claim 1, wherein, when the first network is an SNPN, the NID and the PLMN ID in the SNPN information of the first network are an NID and a PLMN ID of the first network, respectively; and when the second network is an SNPN, the NID and the PLMN ID in the SNPN information of the second network are an NID and a PLMN ID of the second network, respectively.

\* \* \* \* \*

UNITED STATES PATENT AND TRADEMARK OFFICE
CERTIFICATE OF CORRECTION

PATENT NO. : 12,470,930 B2
APPLICATION NO. : 17/950187
DATED : November 11, 2025
INVENTOR(S) : Fei Li et al.

Page 1 of 1

It is certified that error appears in the above-identified patent and that said Letters Patent is hereby corrected as shown below:

In the Claims

Column 26, Claim 1, Lines 39 and 40, change "comp work" to --comprises a network--.

Signed and Sealed this
Ninth Day of December, 2025

John A. Squires
*Director of the United States Patent and Trademark Office*